United States Patent
Ulianenko et al.

(10) Patent No.: US 11,783,101 B2
(45) Date of Patent: Oct. 10, 2023

(54) CREATION OF AN EXPLODED VIEW OF AN ASSEMBLY IN CAD

(71) Applicant: BRICSYS NV, Ghent (BE)

(72) Inventors: Aleksei Ulianenko, Novosibirsk (RU);
Maksim Shilovskii, Novosibirsk (RU);
Evgeny Rukoleev, Novosibirsk (RU);
Egor Ermolin, Berdsk (RU)

(73) Assignee: BRICSYS NV, Ghent (BE)

( * ) Notice: Subject to any disclaimer, the term of this patent is extended or adjusted under 35 U.S.C. 154(b) by 247 days.

(21) Appl. No.: 17/263,501

(22) PCT Filed: Aug. 21, 2019

(86) PCT No.: PCT/EP2019/072414
§ 371 (c)(1),
(2) Date: Jan. 26, 2021

(87) PCT Pub. No.: WO2020/048779
PCT Pub. Date: Mar. 12, 2020

(65) Prior Publication Data
US 2021/0173982 A1 Jun. 10, 2021

(30) Foreign Application Priority Data
Sep. 3, 2018 (EP) .................... 18192292

(51) Int. Cl.
*G06F 30/25* (2020.01)
*G06F 30/10* (2020.01)
(Continued)

(52) U.S. Cl.
CPC .............. *G06F 30/25* (2020.01); *G06F 30/10* (2020.01); *G06T 15/06* (2013.01); *G06T 15/10* (2013.01);
(Continued)

(58) Field of Classification Search
None
See application file for complete search history.

(56) References Cited

U.S. PATENT DOCUMENTS 7,295,201 B2 11/2007 Davis
2017/0161924 A1* 6/2017 Delfino .................... G06T 3/40

FOREIGN PATENT DOCUMENTS

EP 2827303 B1 1/2015
EP 3617913 A1 3/2020

OTHER PUBLICATIONS

Li, Wilmot, et al. "Automated generation of interactive 3D exploded view diagrams." ACM Transactions on Graphics (TOG) 27.3 (2008): 1-7 (Year: 2008).*

(Continued)

*Primary Examiner* — Nurun Flora
(74) *Attorney, Agent, or Firm* — Maschoff Brennan

(57) ABSTRACT

A CAD model comprises multiple parts forming an assembly. Per part, one or more test directions are determined. Per part and per test direction of the part, a blocking subset of parts is determined. For a part and test direction, a candidate set of candidate parts may be filtered via a view box. Based on the test direction, a ray set of border points associated with the part may be determined. A blocking subset may be determined from the candidate set based on ray tracing in the test direction from the border points of the ray set. A disassembly direction and one or more disassembly parts are selected from said multiple parts and the corresponding test directions based on the determined blocking subsets. An exploded view comprising a relative displacement of the one or more disassembly parts in the disassembly direction is created and displayed via a visualization means.

19 Claims, 9 Drawing Sheets

(51) Int. Cl.
G06T 15/06 (2011.01)
G06T 15/10 (2011.01)
G06T 17/00 (2006.01)
G06F 111/20 (2020.01)

(52) U.S. Cl.
CPC ........ *G06T 17/005* (2013.01); *G06F 2111/20* (2020.01); *G06T 2210/12* (2013.01)

(56) References Cited

OTHER PUBLICATIONS

Yang Hu: "i Automatic Selective Disassembly time computation and produce architecture redesign suggestion" Jul. 31, 2013.

J. Yu and J. Zhang, "Hierarchical exploded view generation based on recursive assembly sequence planning", International Journal of Advanced Manufacturing Technology 93(1-4), pp. 1207-1228 (2017), doi : 10.1007/s00170-017-0414-y.

Wilmot Li et al, "Automated generation of interactive 3D exploded view diagrams", ACM Transactions on Graphics, vol. 27, No. 3, Aug. 1, 2008 (Aug. 1, 2008), p. 1.

"An efficient method for exploded view generation through assembly coherence data and precedence relations" World Journal of Engineering, M V A Raju Bahubalendruni, Feb. 2018.

* cited by examiner

FIG. 7
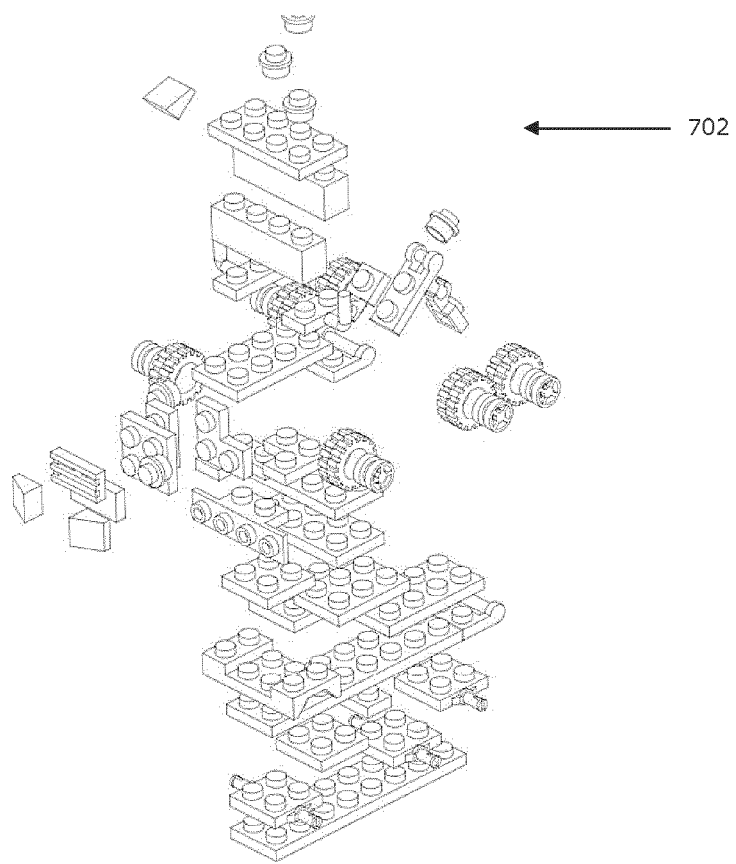
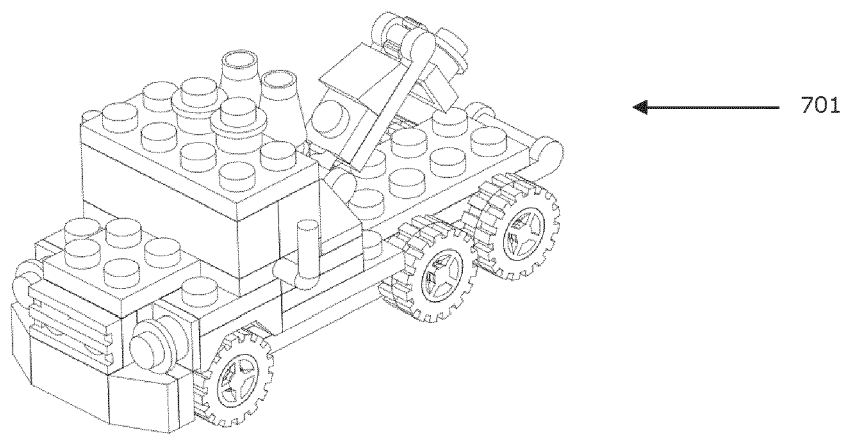

CREATION OF AN EXPLODED VIEW OF AN ASSEMBLY IN CAD

TECHNICAL FIELD

The invention pertains to the technical field of computer-aided design (CAD; G06F 17/50) and the automation of positioning of parts of 3D images (G06T 19/20).

A CAD model comprises computer-processable data representing multiple parts in a first spatial configuration forming an assembly. An exploded view comprises a representation of these multiple parts in a second spatial configuration. The CAD model may be appreciated by the skilled person as comprising a computer-processable image in vector format of the multiple parts, defined in terms of low-level features of the multiple parts, such as, for example, vertices, lines (edges), and surfaces (faces). The present invention pertains to the creation of an exploded view based on the CAD model, and in particular based on the low-level features of the multiple parts.

BACKGROUND

An exploded view drawing of an assembly is a diagram, picture, schematic or technical drawing of an object, that shows the relationship or order of assembly of various parts. It shows the parts of the assembly slightly separated by distance. An exploded view represents the parts of the assembly spread out according to their relationship, in particular positioned to show how they fit together when assembled.

EP 2 827 303 B1 discloses a computer-implemented method for determining at least one exploded path of an exploded view of an assembly of 3D parts. A list of thumbnails is displayed. Each thumbnail corresponds to an automatically computed exploded path of the exploded view of the assembly. A thumbnail is selected by a user. The exploded path corresponding to the selected thumbnail is displayed.

EP 2 827 303 B1 requires the provision of an exploded view, and therefore remains silent on the automatic generation of an exploded view. The present invention aims to automatically generate an exploded view.

U.S. Pat. No. 7,295,201 B2 discloses a method for automatically generating exploded views. A moving part of an assembly is selected. A 2D shadow masked array of integers is created and the values are initialized to zero. Each entry in the array corresponds with a vector direction based on (discretized) theta and phi values of spherical coordinate space. The moving part is represented by one or more points. A stationary part of the assembly is selected. The stationary part is tessellated into one or more triangles. For a first triangle of the stationary part and a first point of the moving part, a shadow cast by the first triangle on a sphere with respect to the first point is computed. The shadow masked array is updated based on the cast shadow: values of the array corresponding with vector directions of the cast shadow are incremented. This is performed for each point of the moving part and each triangle of the stationary part. An explosion direction for the moving part is selected based on the shadow masked array.

U.S. Pat. No. 7,295,201 B2 teaches at least a triple loop: over the points of the moving part, over the triangles of the stationary part, and over the vector directions of the array. For large assemblies comprising numerous parts, this may require a prohibitive amount of computational time and/or resources. Moreover, the document remains silent on how to efficiently select the points of the moving part. The present invention aims to enable quick automated creation of an exploded view, requiring an acceptable amount of computational time and resources.

J. Yu and J. Zhang, "Hierarchical exploded view generation based on recursive assembly sequence planning", *International Journal of Advanced Manufacturing Technology* 93(1-4), pages 1207-1228 (2017), doi: 10.1007/s00170-017-0414-y, hereafter referred to as Yu (2017), discloses a method for automatic exploded view generation.

Yu (2017) illustrates that the function AUTO EXPLODE COMPONENTS of UG NX fails to explode most of the parts to the right position and direction. Often occurring problems, disclosed in the introduction section of Yu (2017), include:
- too much information should be manually input;
- automatically obtained information is not well used;
- determination of feasible explosion directions is inexact, time-consuming, and limited to the axial directions of the global coordinate system; and
- the influence of assembly sequence planning on the layout and visual effect of the exploded view is seldom considered.

Autodesk Inventor 2016 provides for an AUTO EXPLODE functionality. This functionality has been deprecated in Autodesk Inventor 2017. Similarly, Solid Works used to provide for an AUTO EXPLODE functionality, which has been deprecated in recent versions. Reasons for deprecation overlap with the above-stated problems.

There is a need in the art for an improved automatic generation of an exploded view of an assembly, with an improved determination of suitable locations and/or explosion directions for the parts of the assembly.

Yu (2017) discloses that the key elements for generating exploded views are explosion directions, explosion sequences, and displacement vectors. The document discloses hierarchical assembly sequence planning (ASP) based on an extended interference matrix (EIM) and a hierarchical assembly tree (HAT).

The EIM contains information on interference of parts in both the global coordinate system (GBS) as well as a part-specific local coordinate system (LCS). To construct the EIM, Yu (2017) proposes a sequential interference detection algorithm between pairs of parts from coarse to fine, based on a sweeping bounding box method, an extruding bounding face method, an extruding feature face method, and a stepping precise detection method, to sequentially determine whether possible interferences according to a coarse analysis persist according to a finer analysis. For n parts in the assembly, the computational time required for the construction of the EIM scales as $O(n^2)$.

The HAT comprises an assembly root node, subassembly intermediate nodes, and part leaf nodes. The HAT is utilized to group EIM information bottom-up, whereby component (part or subassembly) EIM information of components of a subassembly with the remainder of the assembly (assembly modulo the subassembly) is combined into subassembly EIM information. Disassembly directions are determined top-down, whereby disassembly directions for a subassembly are determined first, based on subassembly EIM information, before determining disassembly directions for its components. The disassembly sequence (order of components and choice of directions) is determined based on a heuristic multi-rule screening (MRS) method taking parallelism, continuity, stability, directionality and manipulability into account. An exploded view is generated bottom-up, thereby adjusting the explosion displacement of a subassembly so that a bounding box of the exploded subassembly does not interfere with the remainder.

Constructing the EIM is the most time-consuming part in the method of Yu (2017), eventually being prohibitively limiting for assemblies with a large number of parts. Positive interferences are ultimately detected via the stepping precise detection method, requiring time-consuming iterative discrete moves. For each active part, many directions are scanned for movement possibilities.

The present invention aims to resolve at least some of the problems mentioned above.

SUMMARY OF THE INVENTION

In a first aspect, the present invention provides a computer-implemented method (CIM) for automatically creating based on a computer-aided design (CAD) model comprising multiple parts forming an assembly an exploded view of the assembly, according to claim 1.

In a second aspect, the present invention provides a computer system for automatically creating based on a CAD model comprising multiple parts forming an assembly an exploded view of the assembly, whereby the computer system is configured for performing the CIM according to the first aspect.

In a third aspect, the present invention provides a computer program product (CPP) for automatically creating based on a CAD model comprising multiple parts forming an assembly an exploded view of the assembly, whereby the CPP comprises instructions which, when the CPP is executed by a computer, cause the computer to carry out the CIM according to the first aspect.

The present invention enables quick and automatic generation of an exploded view for the assembly:
- A candidate (blocking) set for a part is filtered via a view box. Spatial queries based on a view box may be performed efficiently.
- Border points associated with a part for ray tracing in a test direction are determined based on the test direction. This allows to avoid unnecessary/uninteresting border points for ray tracing.
- A blocking subset of parts is determined from the candidate (blocking) set via ray tracing. Pre-filtering via a view box is performed before ray tracing.
- Multiple disassembly parts may be disassembled in the disassembly direction in one step.

BRIEF DESCRIPTION OF FIGURES

FIGS. 6, 7, 8 and 9 show examples of assemblies (301, 401, 501, 601) and corresponding exploded views (302, 402, 502, 602).

DETAILED DESCRIPTION OF THE INVENTION

Figure 1:
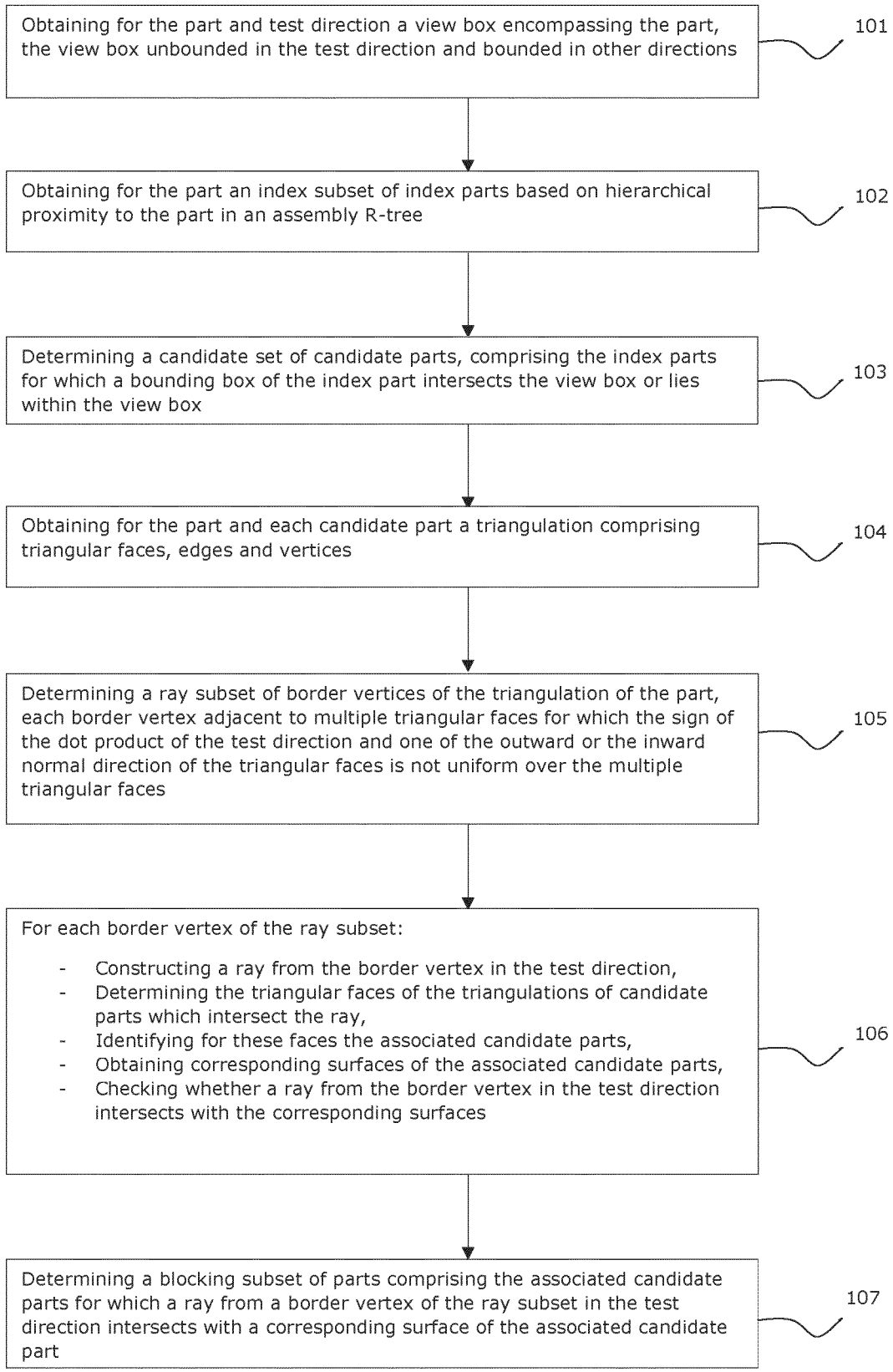
FIGS. 1 and 2 illustrate embodiments of algorithms according to the present invention.

The present invention concerns a computer-implemented method (CIM), a computer system, and a computer program product (CPP) for automatically creating based on a computer-aided design (CAD) model comprising multiple parts forming an assembly an exploded view of the assembly. The present invention has been summarized in the corresponding section above. In what follows, the present invention is described in detail, preferred embodiments are discussed, and the invention is illustrated by means of non-limiting examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

"A", "an", and "the" as used herein refers to both singular and plural referents unless the context clearly dictates otherwise. By way of example, "a compartment" refers to one or more than one compartment.

"Comprise", "comprising", "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, steps, known in the art or disclosed therein. Similarly, "based on" as used herein is synonymous with "based at least in part on" and is an inclusive or open-ended term, which does not exclude or preclude additional non-recited components, features, elements, members, steps, and the like.

A "set/list comprising an element" as used herein comprises computer-processable data enabling to obtain the element, and may refer to a set/list comprising a pointer to the element.

A "computer-aided design model" (CAD model), as used herein, comprises computer-processable data, preferably digital data, about one or more objects. An object may be a part of an assembly. In the present invention, a CAD model comprises multiple parts forming an assembly. A part is preferably a three-dimensional solid. The computer-processable data allows to derive a geometric property of a part and a relative geometric property between two parts. A non-limiting list of "geometric properties" of a part comprises a position; an orientation; a dimension; an inclination; and a radius of curvature. A non-limiting list of "relative geometric properties" of two parts comprises a relative distance; a relative orientation; a relative position; a relative angle; and a relative size. An exemplary file format for storing a CAD model is DWG. A skilled person will appreciate that a CAD model comprises a computer-processable image in vector format, e.g. in DWG format, defined in terms of low level features, such as, for example, vertices, edges, and faces.

A CAD model may be viewed and edited via a corresponding CPP, so-called CAD software. CAD software most preferably provides a graphical user interface (GUI) for viewing and editing the CAD model. A non-limiting list of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, Rout- Cad, SALOME, ShapeManager, SketchUp, Solid Edge, Solid Works, SolveSpace, SpaceClaim, SpaceClaim Engineer, Tekla Structures, TopSolid, TransMagic, TurboCAD, VariCAD, VectorWorks, and VisualARQ.

The Guidelines for Examination in the European Patent Office (November 2018), Chapter G-II 3.3.1 (G-II 3.3.1) discloses that artificial intelligence (AI) and machine learning (ML) are based on computational models and algorithms, which are per se of an abstract mathematical nature. G-II 3.3.1 discloses that the classification of digital images based on low-level features (e.g. edges or pixel attributes for images) is a technical application of classification algorithms based on AI and ML. G-II 3.3.1 implicitly discloses, in the last paragraph, that a classification method may or may not serve a technical purpose. G-II 3.3.1 hence discloses that a method, which may potentially not serve a technical purpose and based on mathematical operations, performed on digital images and based on low-level features (e.g. edges or pixel attributes for images) of the digital images, is a technical application of the method.

In a first aspect, the present invention provides a CIM for automatically creating based on a CAD model comprising multiple parts forming an assembly an exploded view of the assembly. In a second aspect, the present invention provides a computer system for automatically creating based on a CAD model comprising multiple parts forming an assembly an exploded view of the assembly. The computer system is configured for performing the CIM according to the first aspect. In a third aspect, the present invention provides a CPP for automatically creating based on a CAD model comprising multiple parts forming an assembly an exploded view of the assembly. The CPP comprises instructions for performing the CIM according to the first aspect. The CPP comprises in particular instructions which, when the CPP is executed by a computer, such as a computer system according to the second aspect, cause the computer to carry out the CIM according to the first aspect. The present invention may further also provide a tangible non-transitory computer-readable data carrier comprising the CPP. The computer system according to the second aspect may comprise a tangible non-transitory computer-readable storage medium comprising the CPP. The three aspects of the present invention are hence interrelated. Therefore, any feature disclosed in this document may relate to each of the aspects of the present invention, even if it has been disclosed in conjunction with a particular aspect.

One or more disassembly parts of the assembly and a disassembly direction in which the one or more disassembly parts are not blocked by other parts of the assembly are automatically selected. The disassembly parts are selected from said multiple parts forming the assembly. Said multiple parts hence comprise the disassembly parts. A "disassembly part" hereby refers to a part of the assembly selected for "displacement" or "disassembly".

An exploded view comprising a relative displacement of the one or more disassembly parts in the disassembly direction is automatically created and displayed via a visualization means. A "relative displacement" of one or more parts of the assembly refers to a displacement of these one or more parts relative to one or more other parts of the assembly.

In a preferred embodiment, for each part of the assembly one or more test directions are automatically determined. A "test direction" or "explosion direction" of a part is a likely movement direction for the part in "disassembling" the assembly for creating an exploded view. For a part, one or more of its test directions are tested for movement possibility. It is in particular verified for a test direction, preferably each test direction, of a part whether the part can be displaced in the test direction. Displacing the part can be performed when the part is not blocked by other parts in the test direction. It is therefore verified whether a part is blocked or not by other parts in a test direction, preferably each test direction, of the part. In case a part is not blocked in a test direction, the part can be "disassembled" or "removed" from the assembly along said test direction. Removal of one part may unblock another part, and may allow for removal of the other part. A disassembling sequence of steps may therefore be determined to sequentially remove parts from the assembly. In one step, multiple parts may be removed along a common disassembly direction. The disassembly direction for said one or more parts is hence one of the test directions which said one or more disassembly parts have in common. Determining a test direction may involve obtaining a test direction from the CAD model and/or calculating a test direction based on geometric and/or relative geometric information of one or more parts of the CAD model.

For a part of the assembly three global and six local test directions may be determined. For a part of the assembly six global and six local test directions may be determined. The test directions of a part may comprise six global directions and six local directions. In this case, for the part, six global and six local test directions are determined. The six global directions may be parallel to the axes of a global coordinate system of the CAD model. The six global directions may be denoted as '+GX', '−GX', '+GY', '−GY', '+GZ' and '−GZ'. Herein, 'G' denotes global. Herein, 'X', 'Y' and 'Z' denote three axes of a Cartesian coordinate system. Herein, '+' and '−' denote a positive direction and a negative direction along the respective axis. The six local directions are associated with the respective part. The six local directions may be parallel to symmetry axes, inertial axes, or other axes associated with the respective part. The six local directions may be denoted as '+LX', '−LX', '+LY', '−LY', '+LZ' and '−LZ'. Herein, 'L' denotes local.

For another part of the assembly a reduced number of, preferably at most eight, more preferably at most five, even more preferably at most two, most preferably one, test direction(s) may be determined. The test directions of a part may comprise a reduced number of directions. Preferably, in this case, each test direction is parallel to a symmetry axis. A particularly preferred example concerns one or two test directions parallel to a main (longitudinal) axis of symmetry for a standard fastener such as a bolt, a nut or a threaded rod. Determination of a reduced number of test directions may be based on geometric properties, relative geometric properties and/or semantic properties. Preferably, determination of a reduced number of test directions for a part is based on a semantic property of the part. A semantic property of a part may comprise an identification of the function of the part. This is advantageous, as non-useful directions are not even considered as test directions for determining a disassembly sequence. For example, a nut will always comprise a disassembling direction parallel to the length direction of the bolt on which it is fastened.

In a preferred embodiment, for each part of the assembly and each determined test direction of the part, a blocking subset of parts from the assembly is automatically determined. The one or more disassembly parts and the disassembly direction are then automatically selected from the multiple parts of the assembly and the corresponding test directions based on the determined blocking subsets.

In a preferred embodiment, a blocking subset of parts is determined for a part of the assembly and a corresponding test direction by: filtering from the assembly a candidate (blocking) set of candidate parts of the assembly based on a view box; determining a ray set of border points associated with the part based on the test direction; and determining a blocking subset of parts from the candidate set based on ray tracing from the border points of the ray set in the test direction. Preferably, the view box encompasses the part. Preferably, the view box is bounded in directions perpendicular to the test direction. Preferably, the view box is unbounded in the test direction.

In a preferred embodiment, the steps of determining a ray set and determining a blocking subset for a part and a test direction comprise the following steps. For the part and each candidate part of the candidate set a polygonal surface approximation (PSA) is obtained. One or ordinary skill in the art is familiar with polygonal modelling and a PSA. A PSA of a part is a mesh, representing or approximating the surface of the part, which comprises polygonal faces, edges and vertices. A PSA of a solid thereby divides space into two regions: an inside region and an outside region, separated by the PSA. A PSA of a part may coincide with the surface of the part. For example, a PSA of a cuboid may lie entirely on the surface of the cuboid, wherein the surface of the cuboid comprises six planar faces, wherein each vertex, each edge, and each face of the PSA lies on one of the six planar faces. The PSA then represents the surface of the part. A PSA of a part may approximate the surface of the part. The PSA may thereby enclose the surface of the part. The surface of the part may thereby enclose the PSA. For example, a PSA of a spherical surface of a sphere may comprise vertices which lie of the spherical surface, whereby the spherical surface encloses the entire PSA. Preferably, the polygonal faces are triangular faces and the PSA is a triangulation. Most preferably, the PSA is a triangular tessellation of the surface of the part. Obtaining a PSA for a part may involve obtaining the PSA as enclosed in the CAD model and/or calculating the PSA based on the geometry of the part and/or loading the PSA from a tangible transitory or non-transitory computer-readable storage medium (e.g. from cache). From the vertices of the PSA of the part, a ray subset of border vertices is determined based on the test direction. The ray set is in this case the ray subset. The border points are in this case the border vertices. Via ray tracing, faces of the PSA of the candidate parts which intersect with a ray in the test direction from a border vertex of the ray subset are identified. These faces may be referred to as the "intersection subset of faces". Based on the identified intersecting faces, the blocking subset of parts from the candidate set is identified.

This is advantageous as ray tracing and PSAs allow for quick and analytical determination whether a part is blocked in the test direction by a candidate part of the assembly.

In a preferred embodiment, a blocking subset of parts may initially be obtained. The blocking subset may be empty, or may comprise parts added to the blocking subset based on another border vertex or multiple other border vertices of the PSA of the part. Determining the intersection subset of faces for a particular border vertex of the PSA of the part may comprise determining the intersection subset of faces of the PSAs of the candidate parts of the candidate set which are not yet in the blocking subset. The one or more candidate parts for which the intersection subset of faces is determined may hence be the candidate parts which are not (already) in the blocking subset.

This is advantageous, as it avoids identifying a blocking candidate part twice, and thereby reduces the computational cost further.

In a preferred embodiment, a ray subset of border vertices of the PSA of the part is determined. An empty blocking subset of parts is obtained. For each border vertex of the ray subset, an intersection subset of faces of the PSA of one or more candidate parts of the candidate set is determined, whereby the faces of the intersection subset intersect with a ray from the border vertex in the test direction, and one or more candidate parts of the candidate set are added to the blocking subset based on said intersection subset. Preferably, an intersection subset of faces of the PSA of the candidate parts of the candidate set which are not in the blocking subset is determined.

This is advantageous, as it allows for a stepwise build-up of a blocking subset, while avoiding double identification of a blocking candidate part. Moreover, the PSA of candidate parts already in the blocking subset should not be taken into account anymore for ray tracing from other border vertices, reducing the computational cost. In addition, iteration over the border vertices may be aborted once all candidate parts of the candidate set have been added to the blocking subset.

In a preferred embodiment, the step of determining based on the test direction from the vertices of the PSA of the part a ray subset of border vertices comprises the following steps. An empty ray subset is created. For a vertex, and preferably for each vertex, of the PSA of the part, the following steps are performed. The faces of the PSA of the part which are adjacent to the vertex are determined. These faces may be referred to in the present document as the "tangent set of faces", whereby the faces of the tangent set are adjacent to or comprise the vertex. In polygonal modelling, the tangent set is referred to as an "element". For each adjacent face, a sign of a dot product of an outward normal direction or an inward normal direction of the adjacent face with the test direction is obtained. Herein, outward or inward normal refers to the outside and inside regions, respectively, associated with the PSA. It is determined whether the sign of the dot product of the outward or the inward normal direction of the adjacent faces with the test direction is uniform over the adjacent faces. In case the sign of the dot product is not uniform over the adjacent faces, the vertex is identified as a border vertex. Hereby, the sign of the dot product may be positive, negative or undetermined, the latter being the case when the dot product is zero. Herein, "obtaining" of a sign refers to a calculation allowing to derive said sign. One of ordinary skill in the art will appreciate that when a dot product of an inward normal direction of an adjacent face with the test direction is explicitly calculated, this allows to derive each of the sign of the dot product of the inward normal direction of the adjacent face with the test direction and the sign of the dot product of the outward normal direction of the adjacent face with the test direction. In a first embodiment, each identified border vertex is added to the ray subset. In a second embodiment, a border vertex is only added to the ray subset when a dot product of the test direction and the outward normal of at least one of the adjacent faces comprises a positive sign. Consider, for example, a cuboid aligned with the test direction. The cuboid comprises a front face comprising an outward normal parallel with the test direction, a back face comprising an outward normal anti-parallel with the test direction, and four side faces comprising an outward normal perpendicular to the test direction. The cuboid comprises eight corner vertices. The front face comprises four of these corner vertices and the back face comprises the other four corner vertices.

With the second embodiment, the four corner vertices of the front face may be included in the ray subset, while the four corner vertices of the back face will not be included in the ray subset. The four corner vertices of the back face in particular do not provide additional information for ray tracing in the test direction, when the four vertices of the front face are already considered. Hence, in the second embodiment, for each adjacent face, a sign of a dot product of an outward normal direction of the adjacent face with the test direction is obtained, and in case the sign is not uniform over the adjacent faces and in case the sign for at least one adjacent face is positive, the vertex is added to the ray subset. The ray subset comprises hereby border vertices which may be interpreted as (in essence) outermost points of the PSA of the part "in directions perpendicular to the test direction" or "when viewing the PSA in the test direction". Moreover, internal vertices (not on a boundary) of a planar face of the part, whereby the planar face is parallel to the test direction, will not be elected via a tessellation of the planar face and the above method as boundary vertices, further reducing the computational cost.

In a preferred embodiment, for the intersecting faces, i.e. the faces of the intersection set, associated candidate parts are identified, corresponding surfaces of the associated candidate parts are obtained, and intersection of the ray from a border vertex in the test direction with the corresponding surfaces is checked. In this embodiment, the blocking subset is determined based on associated candidate parts for which the ray intersects with a corresponding surface of the associated candidate part. Preferably, intersection of the ray from the border vertex in the test direction with the corresponding surfaces is checked for corresponding surfaces of associated candidate parts of the candidate set which are not (already) in the blocking subset.

This is advantageous, as it allows for a coarse PSA of a candidate part comprising a limited amount of surfaces, edges and vertices, and which encompasses the candidate part, for prescreening purposes. Furthermore, ray tracing from a border vertex of the PSA of the part can still be performed quickly and analytically, and mitigates the need of multiple iterative discrete moves of the part or a surface of the part.

In a preferred embodiment, a hierarchical spatial index of the parts of the assembly is obtained based on the CAD model. Hereby, the CAD model may comprise the hierarchical spatial index and/or the hierarchical spatial index may be constructed based on the CAD model. Preferably, the hierarchical spatial index is a hierarchical assembly tree (HAT). Most preferably, the hierarchical spatial index is a hierarchical spatial R-tree. The candidate set may be filtered based on the view box and the hierarchical spatial index. Preferably, the candidate set is filtered via a spatial query based on the view box and the hierarchical spatial index.

In a preferred embodiment, obtaining a candidate set comprises the following steps. An index subset of index parts of the assembly is obtained. A view box for the part encompassing the part is obtained. The view box is bounded in directions perpendicular to the test direction and unbounded in the test direction. For each index part of the index subset a bounding box is obtained. The candidate set is determined, whereby the candidate set comprises the index parts of the index subset for which the bounding box intersects with the view box.

For each of one or more parts of the assembly, preferably each part of the assembly, a bounding box may be added to the hierarchical spatial index. Alternatively, the CAD model may already comprise for each of one or more parts, preferably each part, a bounding box. In yet another alternative embodiment, a bounding box may be determined for a part when needed, i.e. so-called on-the-fly generation of a bounding box. Determining the candidate set may involve querying the hierarchical spatial index, preferably the hierarchical assembly R-tree, for parts comprising a bounding box which intersects or lies inside of the view box.

This is advantageous, as a prescreening based on the view box of the part and bounding boxes of the index parts is performed to exclude a priori uninteresting parts from the candidate set.

In a preferred embodiment, obtaining an index subset comprises determining an index subset of index parts based on hierarchical proximity to the part in the hierarchical spatial index. Determining the index subset may involve querying the hierarchical spatial index, preferably the hierarchical assembly R-tree, for assembly parts comprising a predefined hierarchical proximity to the part.

In a preferred embodiment, an index subset of index parts of the assembly is constructed based on hierarchical spatial proximity to said part in the hierarchical spatial index. For each index part of the index subset a bounding box is obtained. The candidate set may then be filtered from the index subset based on the bounding boxes of the index parts of the index subset. Preferably, the candidate parts of the candidate set are the index parts of the index subset comprising a bounding box intersecting with or inside of the view box.

This is advantageous, as for n parts in the assembly and an appropriately structured hierarchical spatial index, the computational time required for determining the blocking subsets for all parts of the assembly scales as $O(n \log(n))$, rendering the automatic creation of an exploded view of an assembly with a previously prohibitively large number of parts possible via the present invention. Preferably, the hierarchical spatial index is structured based on subassembly relationships, spatial proximity and/or mutual constraints between parts.

FIG. 1 illustrates an exemplary embodiment of an algorithm (CIM) according to the present invention. The algorithm comprises several steps to determine a blocking subset of parts of the assembly for a part of the assembly and a test direction. A view box is obtained for the part and the test direction (101). The view box encompasses the part, is unbounded in the test direction, and is bounded in other directions, i.e. directions perpendicular to the test direction. The view box may be a bounding box of the part aligned with the test direction, which is extended in the test direction to infinity. An index subset of index parts is obtained for the part based on hierarchical proximity to the part in an assembly R-tree (102). Note that step (102) may precede step (101), as there is no dependency between them. A candidate set of candidate parts is determined (103). The candidate set comprises the index parts of the index subset for which a bounding box of the index part intersects the view box or lies within the view box. For the part and for each candidate part, a triangulation comprising triangular faces, edges and vertices is obtained (104). Note that for all parts of the assembly, a triangulation may be determined beforehand. Step (104) may therefore precede any one, multiple or all of steps (101), (102) and (103). A ray subset of border vertices of the triangulation of the part is obtained (105). The ray subset is determined by checking for each vertex of the triangulation of the part, whether the vertex is a border vertex. Each vertex is adjacent to a tangent set of multiple triangular faces sharing the vertex. In case the sign of the dot product of the test direction and one of the outward or the inward normal direction of the triangular faces is not uniform over the multiple triangular faces of the tangent set, the vertex is identified as a border vertex, and added to the ray subset. Subsequently, for each border vertex of the ray subset, potentially blocking parts for the part in the test direction are identified via a ray from the border vertex in the test direction (106). First, the triangular faces of the triangulations of candidate parts which intersect the ray are determined, the so-called intersection set of triangular faces. Associated candidate parts are identified for the triangular faces of the intersection set. Corresponding surfaces of the associated candidate parts are obtained. Then it is checked with which corresponding surfaces the ray intersects. A blocking subset of parts is determined, comprising the associated candidate parts for which a ray from a border vertex of the ray subset in the test direction intersects with a corresponding surface of the associated candidate part (107).

In a preferred embodiment, the step of selecting the one or more disassembly parts and the disassembly direction from said multiple parts and the corresponding test directions based on the determined blocking subsets comprises the following step. Per test direction, a directed blocking graph comprising nodes and directed edges is constructed based on the determined blocking subsets of parts. Herein, a node represents a part of the assembly. Herein, a directed edge from a first node to a second node represents the part associated with the first node either being blocked by or blocking the part associated with the second node in the test direction. Preferably, a directed edge from a first node to a second node represents the part associated with the first node being blocked in the test direction by the part associated with the second node.

In a preferred embodiment, the step of selecting the one or more disassembly parts and the disassembly direction from said multiple parts and the corresponding test directions based on the determined blocking subsets further comprises the following steps. Per test direction, unblocked parts are determined based on the directed blocking graph of the test direction. Preferably, the unblocked parts are all parts associated with nodes without outgoing directed edges. The one or more disassembly parts and the disassembly direction are then selected based on the determined unblocked parts for all test directions.

In a preferred embodiment, a disassembling sequence is created. A first step is added to the disassembling sequence. The first step corresponds with one or more first disassembly parts and a first disassembly direction. The one or more first disassembly parts are said selected one or more disassembly parts. The first disassembly direction is said selected disassembly direction. The nodes and corresponding edges associated with the one or more first disassembly parts are removed from the directed blocking graphs. Per test direction, subsequent unblocked parts are determined based on the directed blocking graph of the test direction. One or more subsequent disassembly parts and a subsequent disassembly direction are selected based on the determined subsequent unblocked parts for all test directions. A subsequent step is added to the disassembling sequence. The subsequent step corresponds with the one or more subsequent disassembly parts and the subsequent disassembly direction. The nodes and corresponding edges associated with said one or more subsequent disassembly parts are removed from the directed blocking graphs.

In a preferred embodiment, a disassembling sequence is created. While at least one directed blocking graph of the directed blocking graphs comprises at least one edge, the following steps are performed. Per test direction, unblocked parts are determined based on the directed blocking graph of the test direction. Preferably, the unblocked parts are associated with nodes without outgoing edges. One or more disassembly parts and a disassembly direction are selected based on the determined unblocked parts for all test directions. A step is added to the disassembling sequence. The step corresponds with the selected one or more disassembly parts and the selected disassembly direction. The nodes and corresponding edges associated with the selected one or more disassembly parts are removed from the directed blocking graphs.

Figure 2:
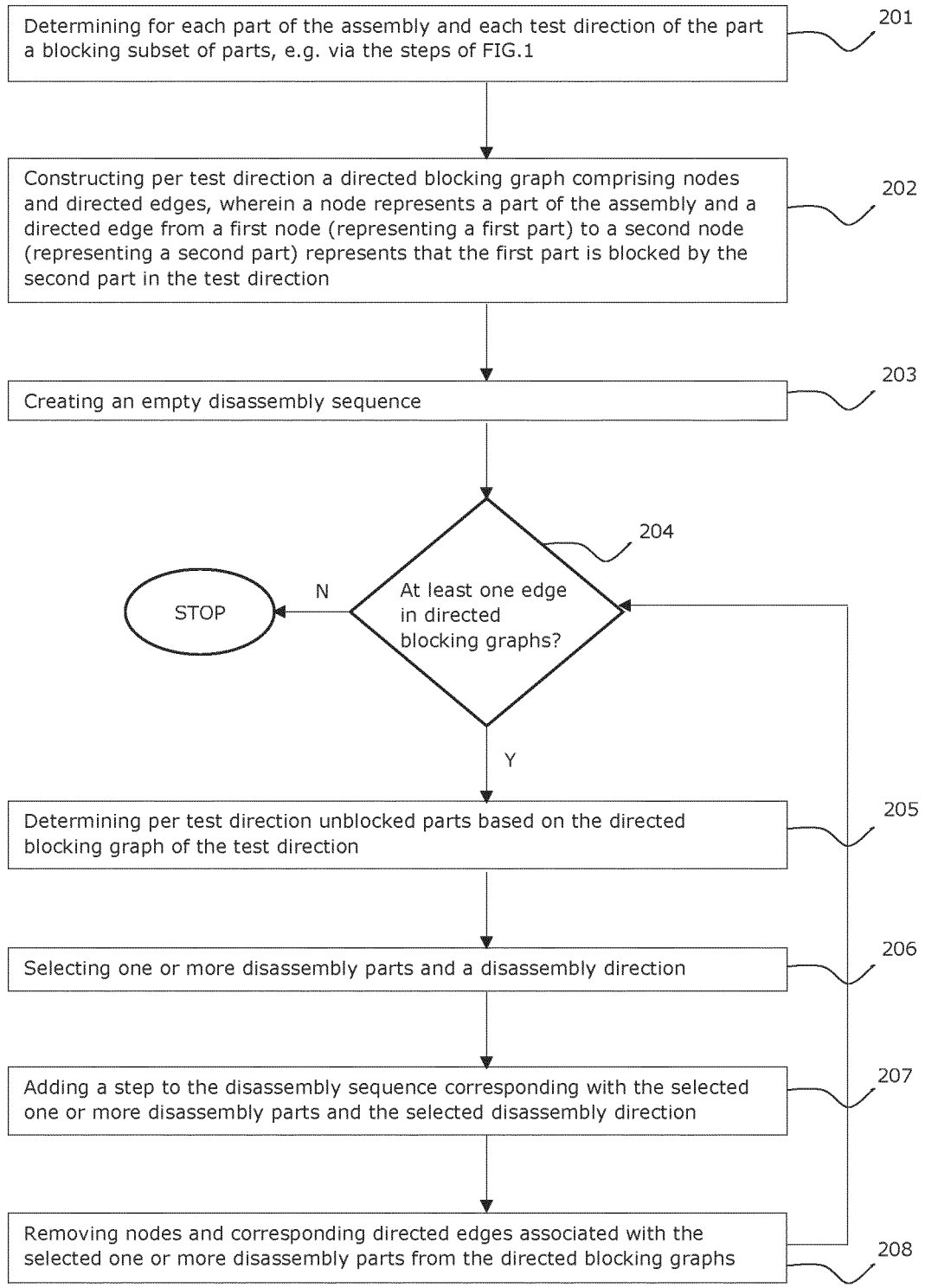

FIG. 2 illustrates an exemplary embodiment of an algorithm (CIM) according to the present invention. The algorithm comprises several steps. For each part of the assembly and each test direction of the part, a blocking subset of parts is determined (201). Step 201 may, for example, concern the algorithm disclosed in relation to FIG. 1. Per test direction, a directed blocking graph comprising nodes and directed edges is constructed (202), based on the determined blocking subsets of parts. A node represents a part of the assembly. A directed edge from a first node (representing a first part) to a second node (representing a second part) represents that the first part is blocked by the second part in the test direction. A disassembly sequence is created (203). While at least one directed edge remains in the directed blocking graphs (204, Y), i.e. while at least one directed blocking graph of the directed blocking graphs comprises at least one edge, one or more parts can be removed. Per test direction, unblocked parts are determined based on the directed blocking graph of the test direction (205). One or more disassembly parts and a disassembly direction are selected (206), based on the determined unblocked parts for all test directions. A step is added to the disassembling sequence (207). The step corresponds with the selected one or more disassembly parts and the selected disassembly direction. Nodes and corresponding directed edges associated with the selected one or more disassembly parts are removed from the directed blocking graphs (208). In case no directed edges remain (204, N), the algorithm stops.

In selecting a disassembly direction, preference may be given to disassembly directions already present in the disassembling sequence. In a preferred embodiment, in case one or more test directions associated with one or more unblocked parts are present as previous disassembly directions in one or more steps of the disassembly sequence, from said one or more test directions the test direction with the largest number of unblocked parts is selected as the disassembly direction; otherwise, from all test directions the test direction with the largest number of unblocked parts is selected as the disassembly direction.

Figure 3:
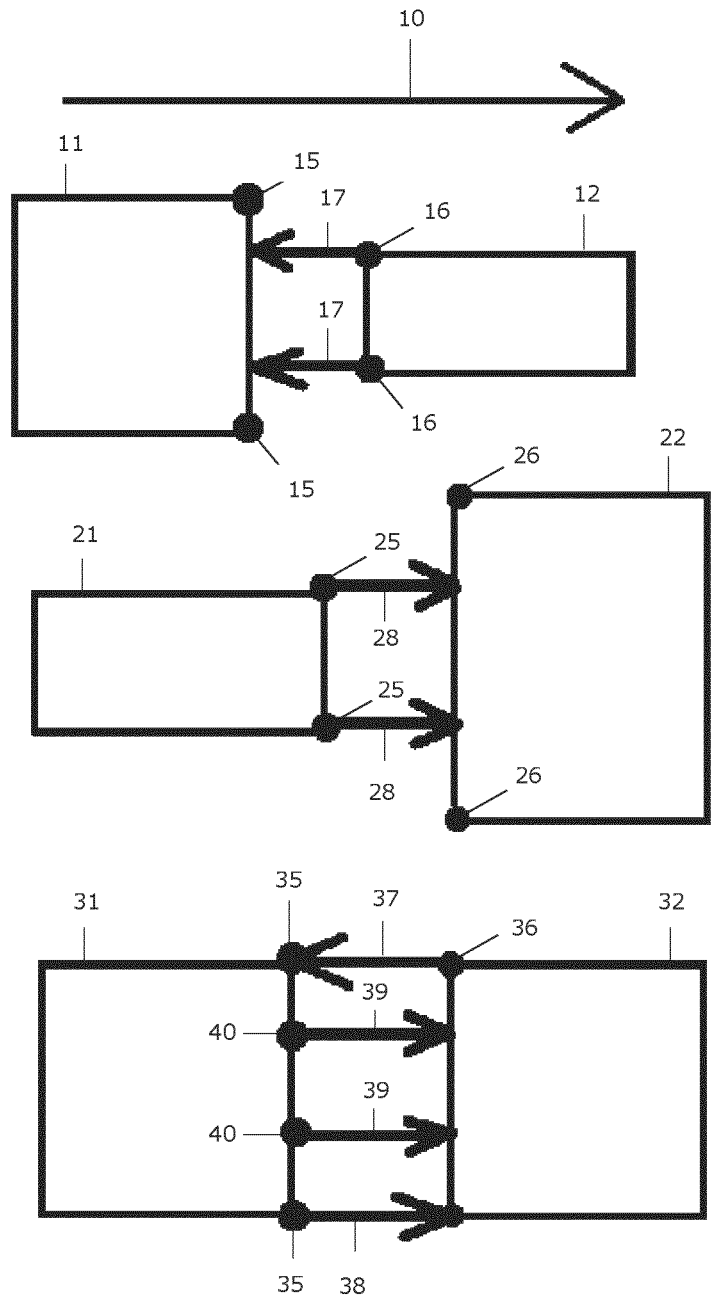
FIGS. 3 and 4 show schematic representations of embodiments according to the present invention concerning a test direction (10, 53) and assembly parts (11, 12, 21, 22, 31, 32, 50, 51, 52).

FIG. 3 shows an exemplary schematic representation displaying a test direction 10 and assembly parts 11, 12, 21, 22, 31 and 32.

Whereas ray tracing in the test direction 10 from border vertices 15 of part 11 alone will not reveal part 12 as a blocking part, combination of ray tracing from parts 11 and 12 (in opposite directions) may reveal that part 12 blocks part 11 in the test direction 10. In particular, rays 17 in a direction opposite of the indicated test direction 10 from border vertices 16 of part 12 may be incident on one or more faces of part 11.

For part 21, ray tracing 28 in the test direction 10 from border vertices 25 reveals part 22 as a blocking part. However, ray tracing in a direction opposite of the indicated test direction 10 from border vertices 26 of part 22 alone will not reveal that part 21 blocks part 22 in said direction opposite of the indicated test direction 10. Combination of ray tracing from parts 21 and 22 (in opposite directions) may reveal that part 21 blocks part 22 in said direction opposite of the indicated test direction 10.

For part 31, rays 38 in the test direction 10 from border vertices 35 will hit an edge of a face of part 32. For part 32, rays 37 in a direction opposite of the indicated test direction 10 from border vertices 36 will hit an edge of a face of part 31. In such a case, it may be ambiguous whether the parts block each other (as is the case for parts 31 and 32 displayed in FIG. 3) or whether the parts in essence do not interfere (for example, a rod and a second part comprising a corresponding hole for the rod). In such a case, one or more additional boundary points 40 may be added to the ray subset of part 31 to identify part 32 as a blocking part of part 31 via ray tracing 39 from the additional border points 40.

In an embodiment, from the vertices of the PSA of the part, a ray subset of border vertices is determined based on the test direction. Via ray tracing from the border vertices of the ray subset of the part in the test direction, a(n initial) blocking subset of parts from the candidate set is identified. For a candidate part, and preferably each candidate part, not in the (initial) blocking subset, a ray subset of border vertices may be determined based on an opposite test direction, wherein the opposite test direction and the test direction are anti-parallel. Ray tracing from the border vertices of the ray subset of the candidate part in the opposite test direction may be performed. In case such a latter ray intersects a face of the PSA of the part or the surface of the part, the candidate part may be added to the blocking subset.

Additionally or alternatively, such information may be derived by combining blocking subsets in opposing directions for a pair of parts. In case the blocking subset of parts in a first direction for a first part comprises a second part and/or the blocking subset of parts in a second direction opposite of the first direction for the second part comprises the first part, the second part blocks the first part in the first direction and the first part blocks the second part in the second direction. Hence, in a preferred embodiment, a directed blocking graph for a test direction is constructed based on the determined blocking subsets of parts in the test direction and in a direction which is opposite of the test direction.

In a preferred embodiment, additional boundary points may be determined in case rays are only incident on edges of faces.

Preferably, an intersection of the view box encompassing the part with a candidate part is determined. If an intersection is found, an intersection box is determined, wherein the intersection box is an intersection of the view box and a bounding box of the candidate part. A portion of the PSA of the candidate part in the intersection box is determined. Preferably, said portion is a truncation of said PSA by said intersection box. An additional boundary point on said portion, which lies inside the intersection box, is determined. Such an additional boundary point may be a center-of-mass point of said portion. Ray tracing from the additional boundary point in an opposite test direction (opposite of the test direction) may be performed to detect blocking.

Additionally or alternatively, an intersection of a candidate view box with the part is determined. The candidate view box encompasses a candidate part, is unbounded in an opposite test direction opposite of the test direction, and is bounded in directions perpendicular to the opposite test direction. If an intersection is found, an intersection box is determined, wherein the intersection box is an intersection of the candidate view box and a bounding box of the part. A portion of the PSA of the part in the intersection box is determined. Preferably, said portion is a truncation of said PSA by said intersection box. An additional boundary point on said portion, which lies inside the intersection box, is determined. Such an additional boundary point may be a center-of-mass point of said portion. Ray tracing from the additional boundary point in the test direction may be performed to detect blocking.

In a preferred embodiment, a truncation of a triangulation (particular type of PSA) with a box is retrieved based on an algorithm disclosed in T. Akenine-Möller, "Fast 3D Triangle-Box Overlap Testing", doi: 10.1145/1198555.1198747. The portion comprises convex 3-, 4-, 5- and/or 6-polygons.

In a preferred embodiment, detecting intersection of a ray with a polygonal face of a PSA is based on an R-tree for one or more bounding boxes of polygonal faces of one or more parts.

In a preferred embodiment, detection of intersection of a ray with a polygonal face of a PSA is based on detection of intersection of a segment from a border point (border vertex) in the test direction (resp. opposite test direction, as the case may be) with the polygonal face, wherein the segment has a finite length.

In a preferred embodiment, detection of ray-triangle intersection is based on an algorithm disclosed in T. Möller & B. Trumbore, "Fast, Minimum Storage Ray-Triangle Intersection", Journal of Graphics Tools 2(1), pages 21-28 (1997), doi: 10.1080/10867651.1997. Ser. No. 10/487,468.

In a preferred embodiment, a next disassembly direction and corresponding one or more disassembly parts may be determined based on previous disassembly directions in the disassembling sequence. An "unscheduled part" of the assembly is a part which does not correspond with a step of the disassembling sequence. A "scheduled part" of the assembly is a part which corresponds with a step of the disassembling sequence. A removable set of unscheduled "removable parts" may be obtained. Each removable part comprises one or more unblocked "removal directions". A removal direction is a test direction which is not blocked by unscheduled parts of the assembly. In this document a removable part may also be referred to as an unblocked part. For each removable part of the removable set and for each scheduled part of the blocking subset of parts of said removable part, presence of the previous disassembly direction of said scheduled part in the one or more unblocked removal directions of the removable part may be verified. In case at least one presence is verified over the removable set, a previous disassembly direction associated with a maximum number of removable parts for which presence is verified may be selected as the next disassembly direction. Otherwise, a removable direction associated with a maximum number of occurrences over the removable parts of the removable set may be identified as the next disassembly direction. One or more removable parts of the removable set comprising the next disassembly direction as removal direction may selected as disassembly parts. The one or more disassembly parts may be added to the disassembling sequence in association with the next disassembly direction. In particular, a step corresponding to the next disassembly direction and the selected one or more disassembly parts may be added to the disassembling sequence. The disassembling sequence may comprise a sequence of zero, one or more steps, each step comprising one or more scheduled disassembly parts of the assembly associated with a common disassembly direction. A new step associated with the next disassembly direction may be added to the disassembling sequence, whereby the new step comprises said one or more disassembly parts.

The inventors have found that a technically useful exploded view may be obtained by determining the disassembling sequence based on previously determined disassembly directions of blocking parts of removable parts.

This is advantageous as it allows for treating the disassembly parts of a step simultaneously. A common relative displacement along the disassembling direction may be determined for all disassembly parts of a step of the disassembling sequence. When, for example, two parts are joined by multiple bolts and nuts, a common disassembling step for all nuts may be determined and a common disassembling step for all bolts may be determined.

In a preferred embodiment, selecting as disassembly parts one or more removable parts of the removable set comprising the next disassembly direction as removal direction may involve a determination of an addition subset of removable parts comprising the next disassembly direction, whereby the removable parts of the addition subset have mutually non-interfering bounding boxes. An empty addition subset may be obtained. An aligned removable set comprising the removable parts of the removable set which comprise the next disassembly direction may be obtained. For each pair of removable parts of the aligned removable set is determined whether the removable parts of the pair are deemed adjacent. Deemed adjacent removable parts comprise bounding boxes which touch or intersect. While the aligned removable set comprises unprocessed parts: an unprocessed removable part with a maximal number of deemed adjacent unprocessed removable parts is selected from the aligned removable set; the selected removable part is added to the addition set; and the selected removable part and the deemed adjacent unprocessed removable parts are identified as processed. The removable parts of the addition set are selected as the one or more disassembly parts.

In a preferred embodiment, a connection graph comprising nodes and edges is obtained. Each node of the connection graph represents a removable part of the aligned removable set. Each edge of the connection graph between two nodes of the connection graph represents deemed adjacent removable parts. While the connection graph comprises nodes: a node of the connection graph which comprises a maximal number of edges is selected; the removable part represented by the selected node is added to the addition set; and all nodes connected to the selected node, the selected node, and all corresponding edges connecting at least one of these nodes are removed from the connection graph.

This is advantageous as it enables quick determination of a minimal amount of successive disassembling steps, whereby each disassembling step comprises disassembly parts with non-interfering bounding boxes. Certain parts may comprise a joint possible removal direction, but joint removal over the same relative displacement does not provide a technically useful exploded view. Consider, for example, an assembly comprising two tangent cogwheels, for which the exploded view preferably comprises a distance in between the two cogwheels.

Determining the removable set may be based on the directed blocking graphs. The removable set may comprise all parts of the assembly for which an associated node in at least one of the directed blocking graphs does not comprise one of incoming or outgoing directed edges. In case a directed edge from a first node to a second node represents the part associated with the first node being blocked by the part associated with the second node, the removable set may comprise all parts of the assembly for which an associated node in at least one of the directed blocking graphs does not comprise an outgoing directed edge, i.e. the part is not blocked in the test direction associated with the particular directed blocking graph. Upon selecting one or more removable parts as disassembly parts, each node corresponding to the one or more disassembly parts may be removed from the directed blocking graphs.

This is advantageous as it allows for quick querying of graphs to obtain the removable set and for simple bookkeeping of which parts are unscheduled.

In a preferred embodiment, a size of a relative displacement for one or more disassembly parts of the assembly along a disassembly direction is determined based on a viewing point and/or a viewing direction.

This is advantageous, as a technically useful exploded view of an assembly should visibly display all parts of the assembly while maintaining a compact spatial extent. Adjusting the relative displacements depending on the point of view, solves this problem.

In a preferred embodiment, a digital file comprising said exploded view is stored on a tangible non-transitory computer-readable storage medium. The digital file may, for example, be a digital file in DWG format, two-dimensional portable document format (PDF), or three-dimensional PDF.

In a preferred embodiment, an exploded computer aided design model comprising said multiple parts in an exploded configuration, preferably based on said relative displacement of said one or more disassembly parts in the disassembly direction, is stored on a tangible non-transitory computer-readably storage medium.

In a preferred embodiment, the following are stored on a tangible non-transitory computer-readable storage medium:
 per part of the assembly, a block definition comprising a geometry of the part;
 an assembled CAD model comprising:
  per part of the assembly, a block reference to the block definition of the part; and
  geometric and/or relative geometric assembled information, so that the block references and assembled information represent the assembly in an assembled configuration;
 an exploded CAD model comprising:
  per part of the assembly, a block reference to the block definition of the part; and
  geometric and/or relative geometric exploded information, so that the block references and exploded information represent the assembly in an exploded configuration.

A block reference of a part comprises a pointer to the block definition comprising the geometry of the part. The exploded information is different from the assembled information, so that the exploded configuration is different from the assembled configuration. The assembled CAD model may or may not comprise one or more of the block definitions. Preferably, the assembled CAD model comprises the block definitions. The exploded CAD model may or may not comprise one or more of the block definitions. The exploded CAD model may or may not be the assembled CAD model. In the former case (exploded CAD model being the assembled CAD model), the assembled CAD model comprises each of the assembled information and the exploded information.

One of ordinary skill in the art is familiar with the terms "block", "block definition" and "block reference". Reference is made to Chapter 17, entitled "The ABCs of Blocks", of the book "AutoCAD 2013 for Dummies", John Wiley & Sons (2012), ISBN 978-1-118-39217-1, pages 369-386. In this chapter, the terms "block", "block definition" and "block reference" are explained and utilized throughout.

The above methodology provides for data compression in storing two configurations of the same set of multiple parts of an assembly, once in an assembled spatial configuration and once in an exploded spatial configuration.

In a preferred embodiment, the exploded view comprises an exploded path along the relative displacement of each disassembly part of the one or more disassembly parts. Preferably, an exploded path is created based on the steps of the disassembling sequence.

In a most preferred embodiment, the determination of a blocking subset of parts for a part and a test direction is performed without iterative moves of the part in the test direction.

In a most preferred embodiment, at least one step of the disassembling sequence corresponds with multiple disassembly parts.

The invention is further described by the following non-limiting examples which further illustrate the invention, and are not intended to, nor should they be interpreted to, limit the scope of the invention.

EXAMPLES

Example 1: Embodiment of an Algorithm According to the Present Invention

The present example relates to a particularly preferred embodiment of an algorithm (CIM) according to the present invention.

A spatial assembly R-tree (assembly tree) is obtained. The CAD model may comprise the assembly tree. The assembly tree may be determined based on the CAD model. The assembly tree comprises leaf nodes, each corresponding to a part. A leaf node thereby does not correspond to a subassembly comprising multiple parts. A leaf node also does not correspond to a part containing a subassembly. The assembly tree may comprise a root node, subassembly intermediate nodes, and part leaf nodes. Preferably, a part is a three-dimensional solid.

I. Initialization

In an initialization step, for each part:
a. the associated three-dimensional geometry is triangulated;
b. a bounding box is computed; and
c. the bounding box associated with this part is added to the assembly tree. Pre-computation of the triangulations and bounding boxes is advantageous as they can be re-used when necessary at negligible computational cost.

II. Determination of the Disassembling Sequence

In a following step, the disassembling sequence is determined. Hereby, determination of test directions for a part, detection of blocking parts for a part in a test direction, and addition of parts to the disassembling sequence is performed bottom-up, starting at the leafs and gradually working up the assembly R-tree. In particular, the algorithm may allow for addition of a part to the disassembling sequence, before the test directions of another part (higher up the assembly R-tree) are determined. A schematic overview of the algorithm is provided. Where indicated, certain aspects are detailed further below.

II.1 Schematic Overview

While there is any leaf node in the assembly tree:
For each leaf node in the assembly tree (corresponding to a test part):
Determine the test directions along which the test part can be moved (either three global and six local ones or a reduced number as discussed) and add them to a list of unchecked test directions for the test part;
While there are parts comprising an unchecked test direction:
For each test part comprising an unchecked test direction:
For each unchecked test direction of the test part:
d Determine the blocking subset of parts for the test part and test direction (further detailed below, see II.2);
Add the information about the parts of the blocking subset in a directed blocking graph corresponding to the test direction, whereby a directed edge (i, j) means that part i is blocked by part j;
If the test direction is a global direction or the opposite direction is a local direction for some parts in the blocking subset, add related information corresponding to the opposite direction to the graph as well
Remove the test direction from the list of unchecked test directions;
Find the base part, i.e. the part that has the most outgoing edges in total;
While at least two parts remain which have not been moved for the exploded view (unscheduled parts):
For each test direction:
Find all parts associated with nodes of the corresponding directed blocking graph which do not have outgoing directed edges;
If at least one such part is found, add the test direction in conjunction with the corresponding parts to a map of candidate directions (the map of candidate directions thereby comprises the removal set of unscheduled removal parts);
If the map of candidate directions is empty, break (no parts can be moved);
Obtain a next removal direction based on the map of candidate directions (further detailed below, see 11.3);
Obtain an addition set of parts that can be moved in the next removal direction (further detailed below, see 11.4) and add a corresponding step comprising the addition set and the next removal direction to the disassembling sequence;
Remove all edges from all directed blocking graphs that are incoming to the parts of the addition set and remove all nodes corresponding to those parts;
Remove the corresponding leaf nodes from the assembly tree and replace the corresponding subassembly with the base part (note that hereby the subassembly node may be converted into a leaf node).

II.2 Detail: Determine for the Test Part and Test Direction a Blocking Subset

Obtain an empty blocking subset;
Extend the bounding box of the test part in the test direction to infinity;
Obtain an empty ray subset of border vertices;
For each vertex from the triangulation of the test part:
Obtain a tangent set of all triangular faces that share the current vertex;
Obtain an uninitialized sign variable;
For each triangular face:
Compute the dot product of the (outward or inward) triangular face normal direction and the given direction;
If the sign variable is uninitialized, set it to the sign of the dot product;
Otherwise (sign variable initialized), if the sign variable does not match the sign of the dot product, then:
Add the point to the ray subset;
Break.

Obtain the candidate set of candidate parts by querying parts with bounding box intersecting the extended box using the assembly tree;

Obtain an empty triangular R-tree and add for each candidate part from the query the triangulation of the candidate part to the triangular R-tree;

For each border vertex from the ray subset:
　Construct a ray along the test direction from the border vertex;
　Obtain the intersection subset of triangular faces by querying all triangular faces which intersect this ray using the triangular R-tree comprising triangular faces;
　For each triangular face of the intersection subset:
　　Determine the associated part;
　　If the associated part is in the blocking subset, continue;
　　Get a corresponding true surface of the associated part;
　　Determine an intersection point of the corresponding true surface with the ray using ray tracing;
　　If an intersection point is determined, add the associated part to the blocking subset, and add the current test part to the blocking subset of the associated part for the opposite direction;

For each candidate part not in the blocking subset:
　If the test direction is not in the list of unchecked test directions for the candidate part, add the opposite direction to the list of unchecked test directions of the candidate part.

This algorithm has several advantages:
1. Compared to algorithms using Boolean operations such as clashes, no iterative moves of the test part are required: the result is obtained using a few simple analytical calculations.
2. Compared to algorithms using projections, less expensive operations are required.
3. Compared to algorithms using rasterization, a smaller number of points is used.
4. By using R-trees, the computational complexity is $O(n \log(n))$ for a representative assembly instead of $O(n^2)$, whereby n is the number of parts.

II.3 Detail: Select a Disassembling Direction

Obtain an empty map of previously used directions;
For each unscheduled removal part in the map of candidate directions:
　Determine a set of possible directions for the unscheduled removal part, i.e. all test directions for the current part in the map of candidate directions;
　Determine a set of previously (i.e. scheduled) blocking parts for the unscheduled removal part;
　For each previously blocking part:
　　Obtain the corresponding disassembling direction;
　　If the disassembling direction is in the set of possible directions, add the disassembling direction in conjunction with the unscheduled removal part to the map of previously used directions;
　If the map of previously used directions is not empty, return the direction from the map of previously used directions with the largest number of assigned parts as the next removal direction, otherwise, return the direction from the map of candidate directions with the largest number of assigned parts as the next removal direction.

II.4 Detail: Obtain an Addition Set of Parts

Construct a connection graph, whereby each vertex corresponds to a part which can be moved in the next removal direction and each edge corresponds to touching or intersecting bounding boxes of the corresponding parts;

Obtain an empty addition set;
While the connection graph is not empty:
　Determine a base vertex, i.e. the vertex with most edges in the connection graph;
　Add the part associated to the base vertex to the addition set;
　Remove all vertices connected to the base vertex, the base vertex, and all edges connecting at least one of the previous vertices from the connection graph;
Return the addition set.

III. Generating the Exploded View

The disassembling sequence is reversed.
For each step of the disassembling sequence:
　If it is the first step, continue;
　Find the furthest point A of the current assembly based on the disassembling direction corrected for the desired 2D projection:
　　Determine the projected direction onto the screen plane of the disassembling direction, based on the position of the camera, the vector towards the 3D scene, and the disassembling direction;
　　If the projected direction is the zero vector, find the furthest point A based on the disassembling direction, otherwise, find the furthest point A based on the projected direction;
　For each part in the step:
　　Find the furthest point B of the current part in the opposite direction;
　　Move the part along (A-B)+gap*direction vector, whereby the direction vector is based on the disassembling direction if the projected direction is the zero vector, and based on the projection direction otherwise.

IV. Discussion

Yu (2017) utilizes test directions of global and local coordinate systems to determine blocking parts. The present invention may also consider for standard fasteners (such as bolts, nuts, threaded rods, etc.) only the main axis of symmetry.

Just defining likely directions is not sufficient, as in realistic assemblies, most parts are blocked by other parts. Such directions should be excluded from the list of possible removal directions on each iteration. To effectively find which parts are blocked by which, an algorithm based on spatial trees and ray tracing is used and allows to find blocking parts effectively. The inventors have found that the algorithm works substantially faster compared to the one disclosed in Yu (2017).

The choice of a possible disassembling direction greatly affects if a technically suitable exploded view is obtained or not. Technical suitability involves visibility and/or non-interference of the parts, compactness of the exploded view, and an easily understandable assembly order for constructing the assembly from its parts. In a first stage of the algorithm, a map between possible removal directions and parts that can be removed is constructed. Then, using this map, the most suitable disassembling direction is chosen using several heuristics. The inventors have developed two heuristics sufficient to provide a valid result. The first heuristic is trying to select the direction which has already been selected. To do that, it is checked, for each current part which can be removed and for each part that has blocked such a current part, whether the direction of removal is in the set of non-blocked directions for this part. If this is the case, the current part is added to a map between already used directions and parts non-blocked in that direction. The already used direction with the largest number of parts to move is selected, if available. If not available, the direction with the largest number of current parts to remove is selected. Thereby, as it would be unclear to see parts touching each other in an exploded view, a filtering of the set of parts to remove is performed. Only parts which are non-interfering can be moved simultaneously. Filtering is performed via the connection graph, thereby guaranteeing that only non-interfering parts will be moved simultaneously.

Exploded views are used as two-dimensional drawings for documentation. Exploded view algorithms work in three-dimensional space. Yu (2017) provides an algorithm whereby bounding boxes of subassemblies are moved to not interfere. However, non-interference in 3D does not imply non-interference in 2D. In the present algorithm, a second heuristic is provided which pertains to a relative displacement based on an extent of the current exploded view in the disassembling direction and further based on a viewing point and/or a viewing direction. This mitigates interference in 2D, while maintaining the minimal gap.

Example 2: Further Implementation Details

This second example pertains to an algorithm according to the first example, comprising further implementation details as specified below.

In the DWG-format, it is possible to define parts of geometry in the drawing as blocks, and then refer to those blocks using so-called block references. Block references allow to refer to both local and external (defined in another file) blocks. Such references are lightweight and contain the ID of the block, the transformation that should be applied to the content of the block, and some other properties. This feature allows to create an effective and lightweight representation of assemblies and their exploded views.

In the context of the present invention, each part may be represented as a block, either local or external. When a part is inserted into an assembly, it means that the block reference to this part is added to the block of the assembly geometry. The assembly structure is stored in the database using a hierarchy of dedicated objects containing IDs of blocks as well as other important data such as names and assembly structure. Each part has a GUID (unique ID) that cannot be changed during any operation. Therefore, each instance of any part can be described by a chain of GUIDs. When an exploded view is created, a dedicated block for this exploded view is created in the database, and then all block references representing parts are copied to that block recursively. Because block references are lightweight, the exploded view is lightweight as well. Copies of block references allow to move them in exploded view independently from the assembly itself. To identify the component corresponding to a given block reference in the exploded view, each block reference is assigned with data information containing the chain of GUIDs, the original transformation and the final transformation computed by the automated exploded view algorithm.

When the assembly is changed (for example, by adding new parts or by removing some parts), the exploded view can be automatically updated as well. The update procedure creates a copy of the current state of the assembly, but it also tries to match the parts with their previous copies. If a match is found, a modification transformation is computed for the previous copy in order to restore the modifications after the update. In case M is the modification transformation in matrix form, A is the transformation applied by the algorithm in matrix form, and F is the final (current) transformation in matrix form, their relations may be expressed as $F=M*A$ and $M=F*A^{-1}$. The modification transformation is stored in the map between new copies of the parts and modification transformations.

When all block references are copied, the algorithm is launched on that copy. After the algorithm finishes, modification transformations will be re-applied to corresponding parts. This is advantageous as it allows to keep user changes when the modifications of the geometry are not of a large scale.

Example 3: Embodiment of an Algorithm According to the Present Invention

The present example pertains to an embodiment of an algorithm to determine for a part and a test direction a blocking subset of parts.

Initially, a candidate set of candidate parts is retrieved for the part and test direction under consideration. Blocking of the part in the test direction by a candidate part is then checked via ray tracing.

The algorithm for detecting blocking parts (parts of the blocking subset) in the test direction creates one or more tasks for each candidate part. Each task is one of the following types:

A primary task is always generated. The primary task concerns ray tracing in the test direction from border points of the ray set associated with the part. This task may create an inverse task or a correction task, if the primary task does not give a conclusive answer, as detailed below.

An inverse task concerns ray tracing in an opposite test direction (opposite of the test direction) from border points of the ray set associated with the candidate part. This task may create an inverse-correction task, if the inverse task does not give a conclusive answer, as detailed below.

The correction task concerns ray tracing in the test direction from additional border points associated with the part.

The inverse-correction task concerns ray tracing in an opposite test direction (opposite of the test direction) from additional border points associated with the candidate part.

A task list is created and tasks of the task list are solved. For each candidate part, a primary task is added to the task list. If the primary task reveals that the candidate part blocks the part in the test direction (cfr. the discussion in relation to FIG. 3 regarding parts 21 and 22), the candidate part is marked as a blocking part. If the primary task reveals that the candidate part is a sliding part, which is the case when incident rays only hit the edges of faces of the candidate part (cfr. the discussion in relation to FIG. 3 regarding parts 31 and 32), an additional correction task is added to the task list and the candidate part is marked as a sliding part. For candidate parts not marked as blocking or sliding parts (cfr. the discussion in relation to FIG. 3 regarding parts 11 and 12), an additional inverse task is added to the task list. If the inverse task reveals that the part is a blocking part for the candidate part in the opposite test direction, the candidate part is marked as a blocking part. If the inverse task reveals that the part is a sliding part for the candidate part in the opposite test direction, which is the case when incident rays only hit the edges of faces of the part, the candidate part is preferably marked as a sliding part and an additional inverse-correction task is added to the task list. If the inverse-correction task reveals that the part is a blocking part for the candidate part in the opposite test direction, the candidate part is marked as a blocking part.

The blocking subset of parts contains the candidate parts of the candidate set which are marked as blocking parts.

Example 4: Blocked Offsets and Free Offsets

Figure 4:
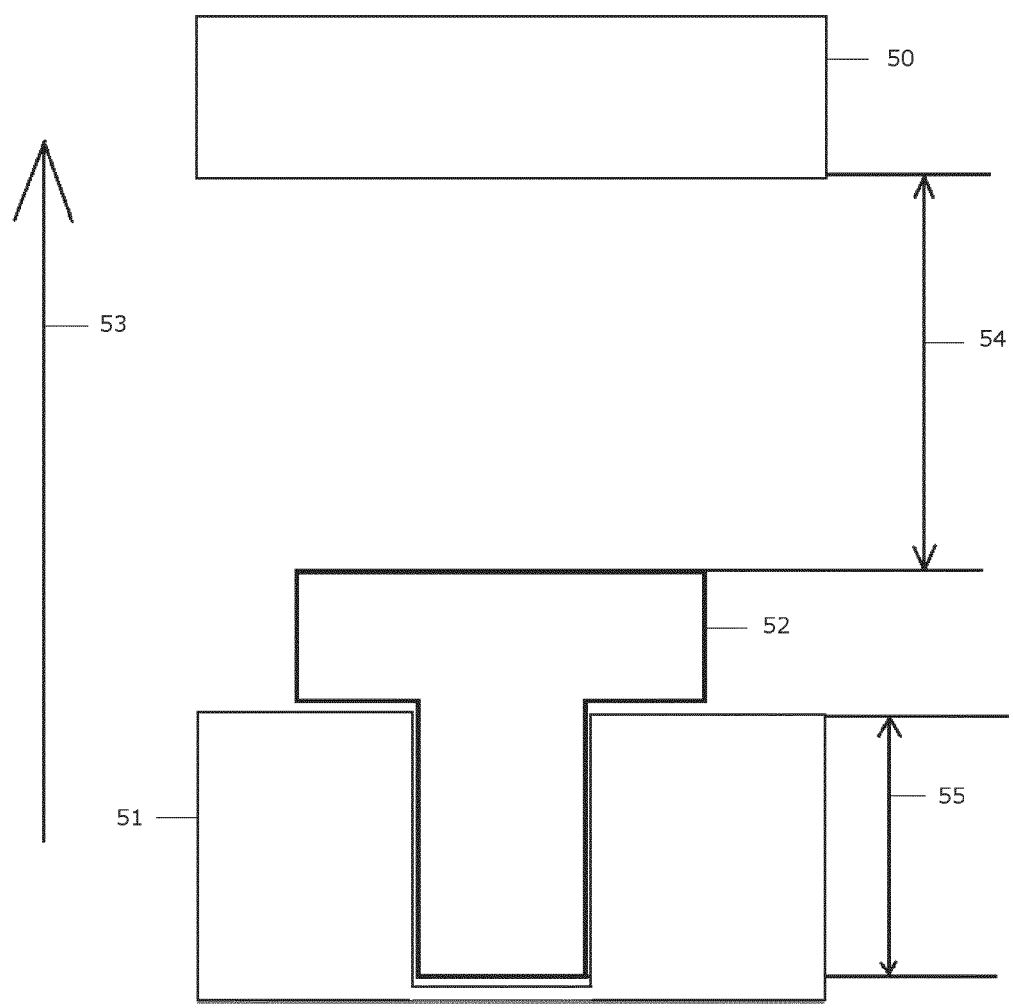

Additionally, for certain standard parts comprising one main symmetry axis, such as bolts and rods, the algorithm may also retrieve blocked offsets and free offsets. Reference is made to FIG. 4. Standard part 52 comprises main symmetry axis 53. The assembly comprises other parts 50 and 51. Standard part 52 comprises blocked offset 55 in relation to part 51, and free offset 54 in relation to part 50.

A blocked offset is the distance required for the standard part to translate in the test direction (parallel to its symmetry axis) to be disengaged from another part.

A free offset is the distance along which the (standard) part can translate in the test direction before interfering with a blocking part in the test direction.

In case the free offset is larger than the blocked offset, a forced relative displacement of the standard part along the test direction can be effected.

Example 5: Hierarchical Assembly R-Tree

Figure 5:
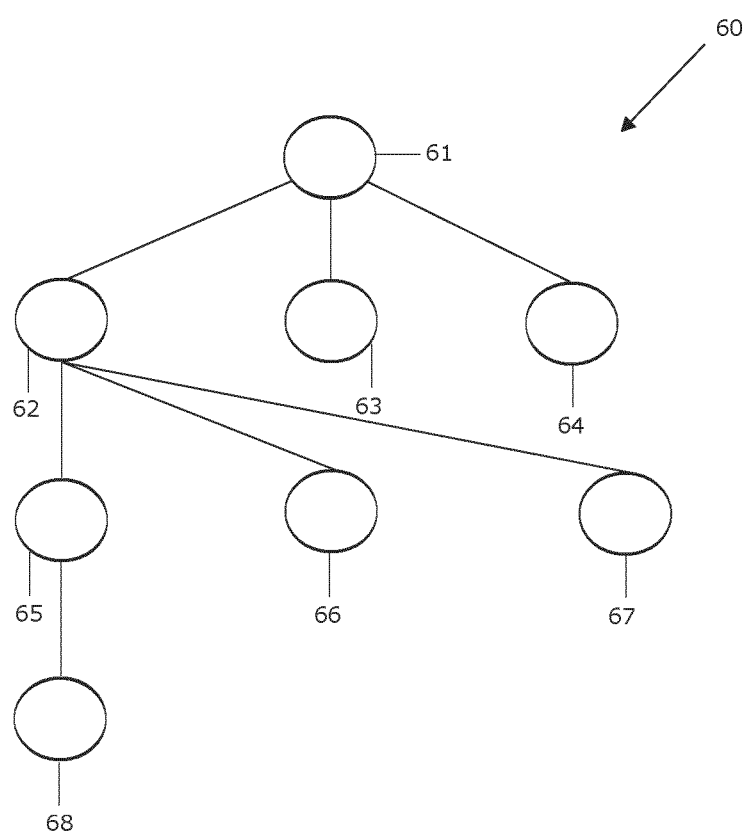
FIG. 5 shows a schematic representation of an embodiment of a hierarchical assembly R-tree (60) comprising an assembly root node (61), subassembly intermediate nodes (62, 65) and part leaf nodes (63, 64, 66, 67, 68).

FIG. 5 shows a schematic representation of an embodiment of a hierarchical assembly R-tree 60 comprising an assembly root node 61, subassembly intermediate nodes 62 and 65 and part leaf nodes 63, 64, 66, 67 and 68.

Example 6: Embodiment of an Algorithm According to the Present Invention

Reference is made to examples 3 and 5. The present example pertains to a leader-follower heuristic. The leader-follower heuristic enables displacement of follower parts (like bolts, screws, pins, rods, etc.) together with their leader part. This enables to efficiently create a "natural" exploded view.

A part is associated with a subassembly node in the hierarchical assembly R-tree. For this part, a leader part is searched for among the parts associated with the subassembly node. A leader part bounding box volume is larger than a follower part bounding box volume. Sliding and blocking parts of the part are identified among the parts associated with the subassembly node.

In case one or more sliding parts have been identified, a leader part is selected from the one or more sliding parts. In case no sliding parts have been identified, the following checks are performed for each pair of parts associated with the subassembly node. Herein, a blocked direction of a part is a test direction in which a blocking part is present. Herein, a slide direction of a part is a test direction in which the part is not blocked, but a sliding part is present. Herein, a free direction of a part is a test direction in which no blocking part and no sliding part are present.
1. Check that the number of blocked directions for a part is greater than 8 and less than 12. This means that only of from 1 to 4 free and/or slide directions are available.
2. Separate free and/or slide directions on global and local sets and check every set.
3. If a set contains less than two free and/or slide directions, mark the pair as not suitable.
4. If a set contains more than two free and/or slide directions, mark the pair as not suitable.
5. If a set contains two free and/or slide directions, check that the free and/or slide directions are in the same half-space (e.g. verify that the dot product of the directions is larger than zero) or are anti-parallel (collinear, but with opposite direction). If true, mark the pair as suitable, and otherwise, mark the pair as not suitable.
6. Create a leader-follower link between parts of a pair marked as suitable.

When a part is displaced via the disassembling sequence, the associated follower parts are displaced too, if the direction is not parallel to the direction of the leader-follower link and the follower parts have not been displaced before.

Example 7: Embodiments of Algorithms According to the Present Invention

The present example may pertain to example 3. The present example may pertain to example 4. The present example may pertain to example 5. The present example may pertain to example 6. The present example pertains to embodiments of algorithms to select a disassembly direction and one or more disassembly parts. Such selection may be based on:
1. Number and/or volume of parts:
    a. For each test direction, the number of free parts can be determined. Free parts do not have blocking parts or sliding parts in the test direction. The preferred disassembly direction may be the test direction with the largest number of free parts.
    b. If for two test directions, the number of free parts is equal, the algorithm compares the number of non-blocked parts in the corresponding test direction. The preferred disassembly direction may then be the test direction with the largest number of non-blocked parts.
    c. If a. and b. do not unambiguously allow to select the disassembly direction, the test direction associated with the smallest total volume of all non-blocked parts may be selected.
2. Least amount of sliding: test directions with less associated sliding parts may be preferred.
3. Subassembly history: To select between non-blocked directions, the non-blocked direction previously selected for the largest number of parts of the subassembly as disassembly direction may be preferred. If most parts in the subassembly were moved in the +GY direction, then the +GY direction will be preferred as disassembly direction for parts of the subassembly, if it is available and does not conflict with other criteria.
4. Neighborhood history: To select between non-blocked directions, the non-blocked direction previously selected for the largest number of spatially neighboring parts as disassembly direction may be preferred. If adjacent parts were moved in the (1.0; 0.0; 0.0) direction, then the (1.0; 0.0; 0.0) direction will be preferred as disassembly direction, if it is available and does not conflict with other criteria.

Example 8: Embodiment of an Algorithm According to the Present Invention

The present example pertains to each one of examples 3, 4, 5, 6 and 7. The present example pertains to an embodiment of an algorithm for creating a disassembling sequence.

For each part, a priority and disassembly direction is determined. The disassembly sequence is obtained by sorting parts based on the priorities. An explosion priority of a part is determined as specified below.

After obtaining the hierarchical assembly R-tree (HAT) and triangulations for all parts, the HAT is ordered based on branch length. Creation of the disassembling sequence starts with the HAT root node as start node:
1. Get node;
2. If the node has children (child nodes) go to the first child (from the longest branch) else go to step 4;
3. Go to step 1;
4. Calculate EIM and CG for the node;
5. Make assembly set—set of parts from the node;
6. Make leader-follower links;
7. Make a list of all removable sets of removable parts comprising a common removal direction;
8. Select a removable set as disassembly set, e.g. according to example 7. If it does not exist or empty go to step 11;
9. Add a step to the disassembling sequence based on the selected disassembly set and remove the disassembly set and parts from the assembly set and EIM. If the disassembly set is equal to all remaining parts in the assembly set, the algorithm adds this set in its entirety to the disassembling sequence;
10. If the size of the assembly set is greater than 1 go to step 7;
11. Try to move blocked standard parts if they are in the subassembly. Find all (not yet disassembled) standard parts which have a free offset which is greater than a blocked offset. Displace these parts along the symmetry axis over a distance which is equal to the blocked offset plus a triangulation tolerance, and mark it as a forced move. Update EIM and go to step 7;
12. If the node comprises one or more subassemblies not moved after said trying, then convert the one or more subassemblies to parts which they comprise, and go to step 4;
13. Add all remaining parts in the assembly set to the disassembling sequence;
14. If a parent node exists, then convert the node to a subassembly node and add it to the parent node part list; else, finish the algorithm;
15. Go to the parent node and remove the disassembled node from the child list;
16. Go to step 2;

Example 9: Exploded Paths

The present example pertains to example 6. The present example may in addition pertain to any one or multiple of examples 3, 4, 5, 7 and 8. The present example pertains to an embodiment of an algorithm for creating and displaying an exploded view comprising one or more exploded paths or 'trailing lines'.

A trailing line is a 3D polyline which shows a path of displacement for a part. One or ordinary skill in the art will appreciate that a two-dimensional exploded view comprises a two-dimensional representation of such a 3D polyline. A trailing line preferably connects two parts and shows how the parts have been relatively displaced. A trailing line helps the viewer to understand a static exploded view. Start and/or end points for a trailing line may be selected as:
the center of a part bounding box;
the insertion point of a part;
a user-defined point.

Trailing lines are preferably created using information from disassembling steps. When the leader-follower heuristic is utilized, disassembling steps for a leader part of a follower part have to be taken into account for constructing the trailing line for the follower part:
1. Collect all transformations for a follower part from the steps.
2. Find a corresponding leader part which effected follower part displacement via the leader-follower link.
3. Apply the corresponding leader part transformation to the follower part transformations.
4. Create a trailing line based on these transformations from start to end.

Example 10: Example Exploded Views of Embodiments

FIGS. 6, 7, 8 and 9 show several illustrative examples of assemblies (301, 401, 501, 601) and corresponding exploded views (302, 402, 502, 602).

Figure 6:
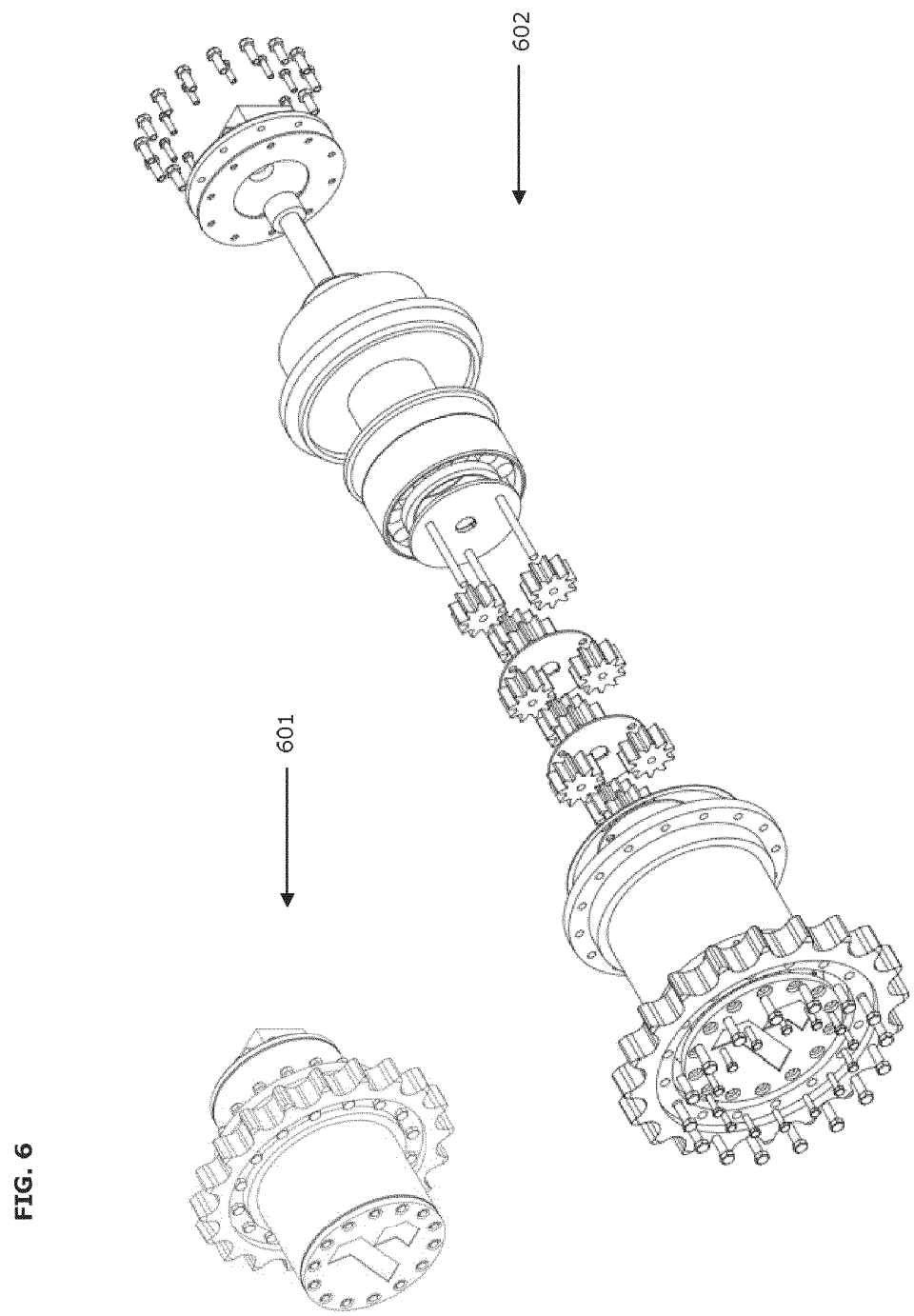
Figure 8:
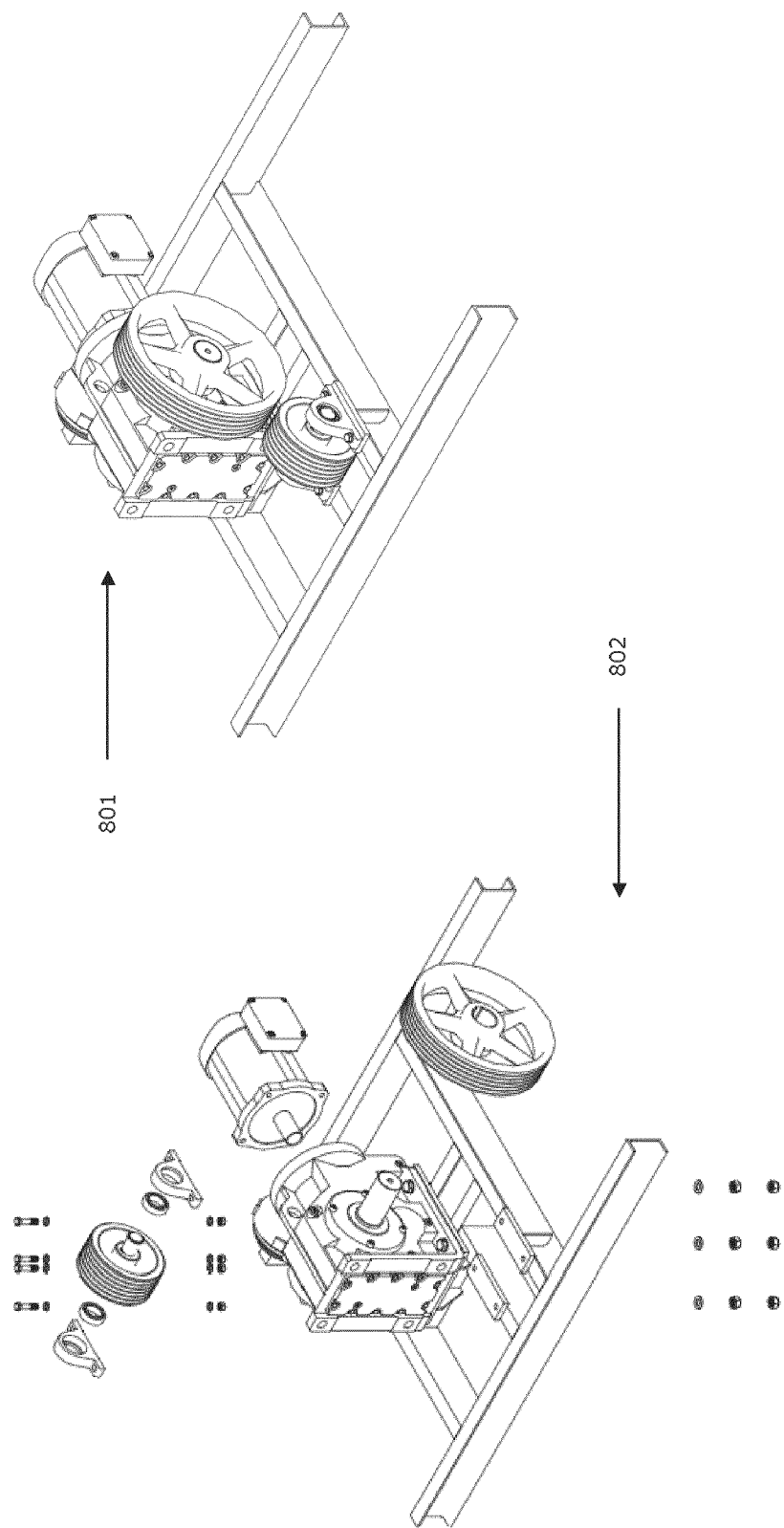
Figure 9:
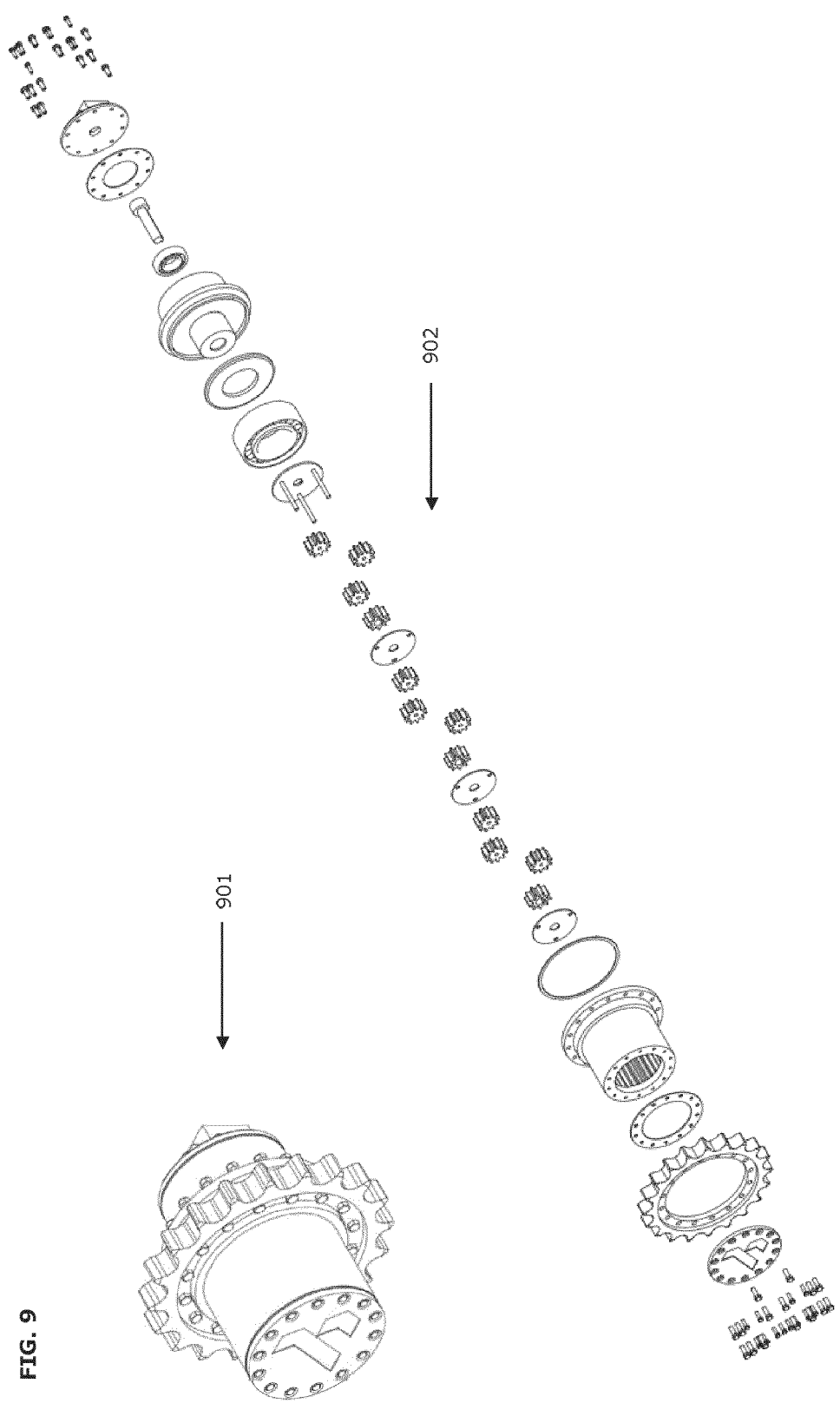

FIGS. 6 and 7 demonstrate results generated via the algorithm disclosed in example 1, but without correction for projection. FIGS. 8 and 9 demonstrate results generated via the entire algorithm as disclosed in example 1.

The invention claimed is:
1. A computer-implemented method for automatically creating based on a computer-aided design model comprising multiple parts forming an assembly an exploded view of the assembly, comprising the steps of:
automatically selecting one or more disassembly parts of the assembly and a disassembly direction in which the one or more disassembly parts are not blocked by other parts of the assembly, comprising the steps of:
determining for each part of the assembly one or more test directions;
determining for each part of the assembly and each test direction of the part a blocking subset of parts from the assembly, comprising:
filtering from the assembly a candidate set of candidate parts of the assembly based on a view box encompassing the part, the view box bounded in directions perpendicular to the test direction and unbounded in the test direction;
determining based on the test direction a ray set of border points associated with the part; and
determining a blocking subset of parts from the candidate set based on ray tracing from the border points of the ray set in the test direction, comprising:
obtaining for the part and each candidate part of the candidate set a polygonal surface approximation comprising faces, edges and vertices,
determining based on the test direction from the vertices of the polygonal surface approximation of the part a ray subset of border vertices, said ray subset being said ray set, said border vertices being said border points;
identifying via ray tracing faces of the polygonal surface approximations of the candidate parts which intersect with a ray in the test direction from a border vertex of the ray subset; and
identifying based on the identified intersecting faces the blocking subset of parts from the candidate set, and
selecting the one or more disassembly parts and the disassembly direction from said multiple parts and the corresponding test directions based on the blocking subset of parts determined for each part of the assembly; and automatically creating and displaying via a visualization means an exploded view comprising a relative displacement of the one or more disassembly parts in the disassembly direction.

2. The computer-implemented method according to claim 1, wherein the step of determining based on the test direction from the vertices of the polygonal surface approximation of the part a ray subset of border vertices comprises:
creating an empty ray subset; and
for each vertex of the polygonal surface approximation of the part, performing the steps of:
determining the faces of the polygonal surface approximation of the part which are adjacent to said vertex;
obtaining for each adjacent face a sign of a dot product of an outward normal direction of the adjacent face with the test direction; and
in case the sign is not uniform over the adjacent faces and in case the sign for at least one adjacent face is positive, adding the vertex to the ray subset.

3. The computer-implemented method according to claim 1, comprising the step of obtaining a hierarchical spatial index of the parts of the assembly based on the computer-aided design model, wherein the candidate set is filtered based on the view box and the hierarchical spatial index.

4. The computer-implemented method according to claim 3, wherein the step of filtering the candidate set comprises:
obtaining an index subset of index parts of the assembly based on hierarchical proximity to said part in the hierarchical spatial index;
obtaining for each index part of the index subset a bounding box; and
filtering the candidate set from the index subset based on the bounding boxes of the index parts of the index subset.

5. The computer-implemented method according to claim 1, wherein the step of selecting the one or more disassembly parts and the disassembly direction from said multiple parts and the corresponding test directions based on the determined blocking subsets comprises the steps of:
constructing per test direction a directed blocking graph comprising nodes and directed edges based on the determined blocking subsets of parts, wherein a node represents a part of the assembly, wherein a directed edge from a first node to a second node represents the part associated with the first node either being blocked by or blocking the part associated with the second node in the test direction;
determining per test direction unblocked parts based on the directed blocking graph of the test direction; and
selecting the one or more disassembly parts and the disassembly direction based on the determined unblocked parts for all test directions.

6. The computer-implemented method according to claim 5, comprising the steps of:
creating a disassembling sequence;
adding a first step to the disassembling sequence, the first step corresponding with one or more first disassembly parts and a first disassembly direction, the one or more first disassembly parts being said selected one or more disassembly parts, the first disassembly direction being said selected disassembly direction;
removing nodes and corresponding edges associated with said one or more first disassembly parts from the directed blocking graphs;

determining per test direction subsequent unblocked parts based on the directed blocking graph of the test direction;
selecting one or more subsequent disassembly parts and a subsequent disassembly direction based on the determined subsequent unblocked parts for all test directions;
adding a subsequent step to the disassembling sequence, the subsequent step corresponding with the one or more subsequent disassembly parts and the subsequent disassembly direction; and
removing nodes and corresponding edges associated with said one or more subsequent disassembly parts from the directed blocking graphs.

7. The computer-implemented method according to claim 1, wherein the step of selecting the one or more disassembly parts and the disassembly direction from said multiple parts and the corresponding test directions based on the determined blocking subsets comprise the steps of:
constructing per test direction a directed blocking graph comprising nodes and directed edges based on the determined blocking subsets of parts, wherein a node represents a part of the assembly, wherein a directed edge from a first node to a second node represents the part associated with the first node either being blocked by or blocking the part associated with the second node;
creating a disassembling sequence; and
while at least one directed blocking graph of the directed blocking graphs comprises at least one edge for:
determining per test direction unblocked parts based on the directed blocking graph of the test direction;
selecting one or more disassembly parts and a disassembly direction based on the determined unblocked parts for all test directions;
adding a step to the disassembling sequence corresponding with the selected one or more disassembly parts and the selected disassembly direction; or
removing nodes and corresponding edges associated with the selected one or more disassembly parts from the directed blocking graphs.

8. The computer-implemented method according to claim 1, wherein:
in case one or more test directions associated with one or more unblocked parts are present as previous disassembly directions in one or more steps of the disassembly sequence, from said one or more test directions the test direction with the largest number of unblocked parts is selected as the disassembly direction; and
otherwise, from all test directions the test direction with the largest number of unblocked parts is selected as the disassembly direction.

9. The computer-implemented method according to claim 1, wherein for a part of the assembly three global and six local test directions are determined, and wherein for another part of the assembly a reduced number of test directions is determined.

10. The computer-implemented method according to claim 1, wherein the size of a relative displacement for one or more disassembly parts of the assembly along a disassembly direction is determined based on a viewing point and/or a viewing direction.

11. The computer-implemented method according to claim 1, comprising the step of storing a digital file comprising said exploded view or a computer-aided design model comprising said multiple parts in an exploded configuration on a tangible non-transitory computer-readable storage medium.

12. The computer-implemented method according to claim 1, comprising the steps of storing on a tangible non-transitory computer-readable storage medium:
- for each part of the assembly a block definition comprising a geometry of the part;
- an assembled computer-aided design model comprising:
  - for each part of the assembly a block reference to the block definition of the part; and
  - geometric and/or relative geometric assembled information, so that the block references and assembled information represent the assembly in an assembled configuration; and
- an exploded computer-aided design model comprising:
  - for each part of the assembly a block reference to the block definition of the part; and
  - geometric and/or relative geometric exploded information, so that the block references and exploded information represent the assembly in an exploded configuration, wherein:
- a block reference of a part comprises a pointer to the block definition comprising the geometry of the part,
- the exploded information is different from the assembled information,
- the assembled computer-aided design model does or does not comprise one or more of said block definitions,
- the exploded computer-aided design model does or does not comprise one or more of said block definitions, and
- the exploded computer-aided design model is or is not the assembled computer-aided design model, in which former case the assembled computer-aided design model comprises each of said assembled information and said exploded information.

13. A computer system for automatically creating based on a computer-aided design model comprising multiple parts forming an assembly an exploded view of the assembly, the computer system configured for performing the computer-implemented method according to claim 1.

14. A non-transitory computer program product for automatically creating based on a computer-aided design model comprising multiple parts forming an assembly an exploded view of the assembly, the non-transitory computer program product comprising instructions which, when the computer program product is executed by a computer, cause the computer to carry out the computer-implemented method according to claim 1.

15. The computer-implemented method according to claim 1, wherein:
- the polygonal surface approximation is a triangulation; and
- the faces are triangular faces.

16. The computer-implemented method according to claim 3, wherein
- the hierarchical spatial index is a hierarchical assembly R-tree; and
- the candidate set is filtered via a spatial query based on the view box and the hierarchical spatial index.

17. The computer-implemented method according to claim 4, wherein the candidate parts of the candidate set are the index parts of the index subset comprising a bounding box intersecting with or inside of the view box.

18. The computer-implemented method according to claim 9, wherein for the other part of the assembly the reduced number of test directions is determined parallel to a symmetry axis, such as one or two test directions parallel to a main axis of symmetry for a standard fastener such as a bolt, a nut or a threaded rod.

19. The computer-implemented method according to claim 12, wherein the assembled computer-aided design model comprises said block definitions.

* * * * *